(12) United States Patent
Braun et al.

(10) Patent No.: US 9,834,930 B2
(45) Date of Patent: Dec. 5, 2017

(54) GLAZING

(71) Applicants: BAUGLASINDUSTRIE GMBH, Schmelz/Saar (DE); PILKINGTON DEUTSCHLAND AG, Gelsenkirchen (DE)

(72) Inventors: Thomas Braun, Heusweiler (DE); Christoph Claesges, Saarlouis (DE); Wolfgang Dutt, Wallerfangen (DE); Kurt-Henrik Mueller, Neuss (DE)

(73) Assignees: Pilkington Deutschland AG, Gelsenkirchen (DE); Bauglasindustrie GmbH, Schmelz/Saar (DE)

( * ) Notice: Subject to any disclaimer, the term of this patent is extended or adjusted under 35 U.S.C. 154(b) by 0 days.

(21) Appl. No.: 14/392,363

(22) PCT Filed: Jul. 18, 2014

(86) PCT No.: PCT/EP2014/065542
§ 371 (c)(1),
(2) Date: Jan. 14, 2016

(87) PCT Pub. No.: WO2015/007899
PCT Pub. Date: Jan. 22, 2015

(65) Prior Publication Data
US 2016/0138266 A1   May 19, 2016

(30) Foreign Application Priority Data

Jul. 18, 2013  (GB) .................................. 1312882.2
Oct. 7, 2013   (GB) .................................. 1317710.0
May 19, 2014   (GB) .................................. 1408860.3

(51) Int. Cl.
*E04C 2/54*   (2006.01)
*E06B 3/66*   (2006.01)
(Continued)

(52) U.S. Cl.
CPC ................ *E04C 2/543* (2013.01); *E04C 2/54* (2013.01); *B32B 17/10045* (2013.01);
(Continued)

(58) Field of Classification Search
CPC ... E04C 2/543; E04C 2/54; E06B 3/66; E06B 3/6621; E06B 3/6715; B32B 17/10045; B32B 17/10055
See application file for complete search history.

(56) References Cited

U.S. PATENT DOCUMENTS 2,325,773 A * 8/1943 Hennesay ............... F24C 15/04
                                                126/200
3,251,667 A * 5/1966 Touvay ................... C03B 18/04
                                                65/182.3
(Continued)

FOREIGN PATENT DOCUMENTS

AT      285081 B    10/1970
DE    1496047 A1     5/1969
(Continued)

OTHER PUBLICATIONS

European Patent Office; International Search Report of PCT/EP2014/065542; dated Mar. 30, 2015; European Patent Office, Rijswijk, Netherlands.

*Primary Examiner* — Donald J Loney
(74) *Attorney, Agent, or Firm* — Marshall & Melhorn, LLC

(57) ABSTRACT

Glazings comprising first and second channel-section glazing elements are described. The first and second channel-section glazing elements are arranged to define a cavity in which is located an inner glazing element comprising a glass glazing element, in particular a soda-lime-silica glass sheet, channel-section glazing element or sheet of rolled glass having at least one fire polished edge. The inner glazing element divides the cavity into at least two spaces to improve the thermal and/or noise performance of the glazing. By using low emissivity coatings on one or more major surfaces of one or more of the glazing elements, the thermal performance may be further improved. Mechanical perfor-
(Continued)

mance may be modified by the particular type of inner glazing element used. It is possible to retrofit existing glazings to improve the thermal and/or noise performance thereof.

17 Claims, 13 Drawing Sheets

(51) Int. Cl.
 *E06B 3/67* (2006.01)
 *B32B 17/10* (2006.01)
(52) U.S. Cl.
 CPC ........... *B32B 17/10055* (2013.01); *E06B 3/66* (2013.01); *E06B 3/6621* (2013.01); *E06B 3/6715* (2013.01)

(56) References Cited

U.S. PATENT DOCUMENTS

| | | | | |
|---|---|---|---|---|
| 3,414,454 | A | * | 12/1968 | Long ............... C03B 18/04 428/192 |
| 4,828,900 | A | * | 5/1989 | Mouly ............... C03B 21/02 428/192 |
| 5,769,921 | A | * | 6/1998 | Yokokawa .......... C03B 19/1453 65/412 |
| 7,641,954 | B2 | | 1/2010 | Rouanet et al. |
| 2006/0144013 | A1 | | 7/2006 | Rouanet et al. |
| 2006/0201078 | A1 | | 9/2006 | Card et al. |

FOREIGN PATENT DOCUMENTS

| | | |
|---|---|---|
| DE | 2407877 A1 | 8/1975 |
| DE | 3126583 A1 | 1/1983 |
| DE | 8815969 U1 | 2/1989 |
| DE | 20319907 U1 | 4/2004 |
| EP | 0374891 B1 | 4/1994 |
| EP | 0742324 A1 | 11/1996 |
| EP | 2752292 A1 | 7/2014 |
| FR | 1218352 A | 5/1960 |
| FR | 1470375 A | 2/1967 |
| FR | 2256295 A1 | 7/1975 |
| WO | 99/40290 A1 | 8/1999 |
| WO | 2005/033432 A1 | 4/2005 |
| WO | 2008/068324 A1 | 6/2008 |

\* cited by examiner

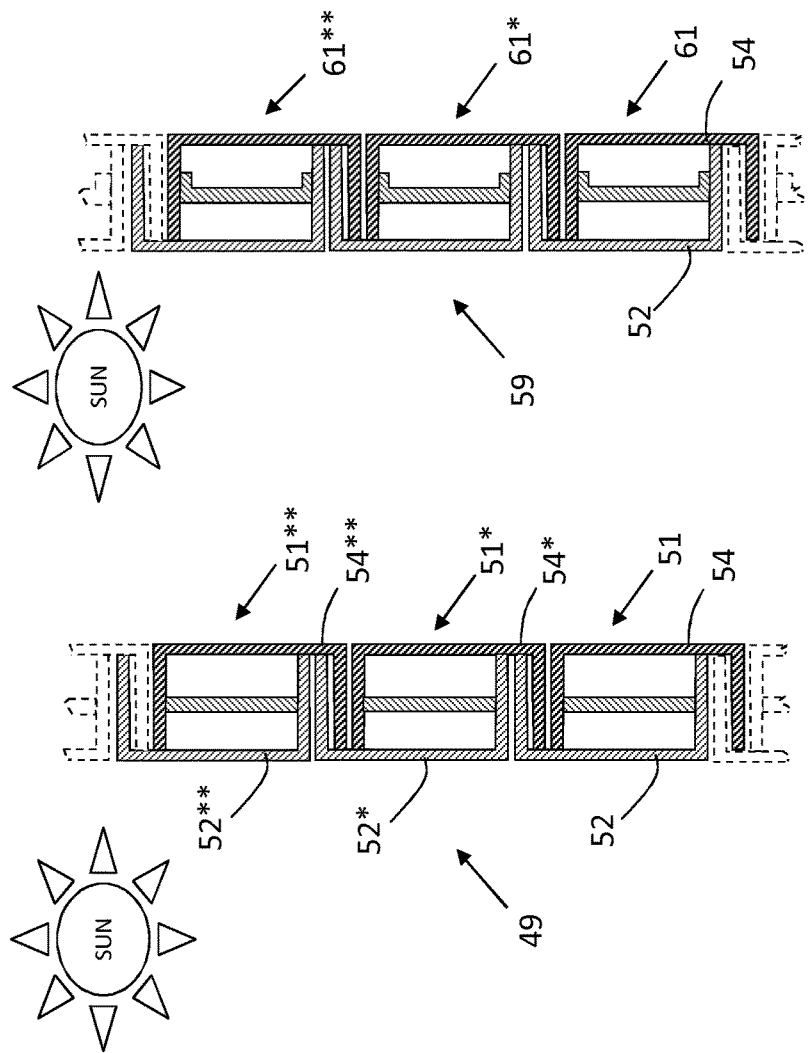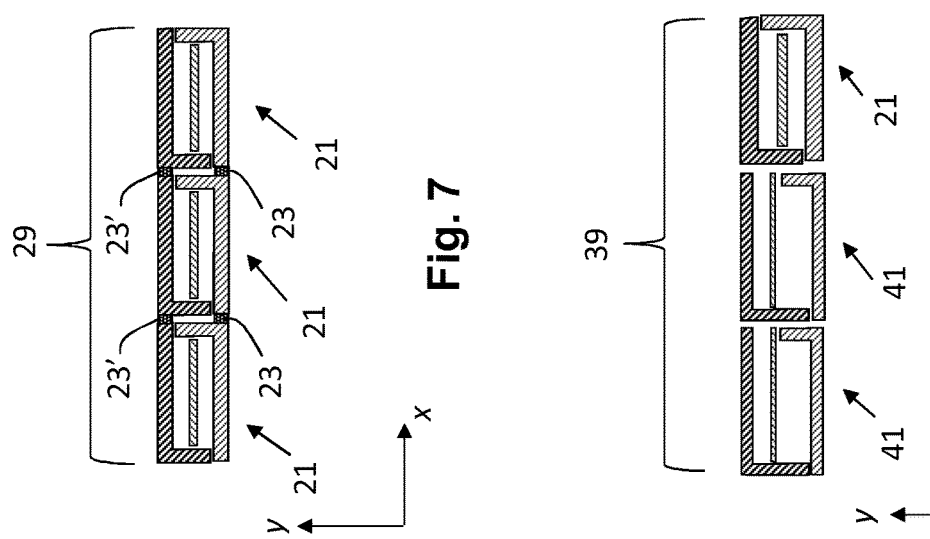

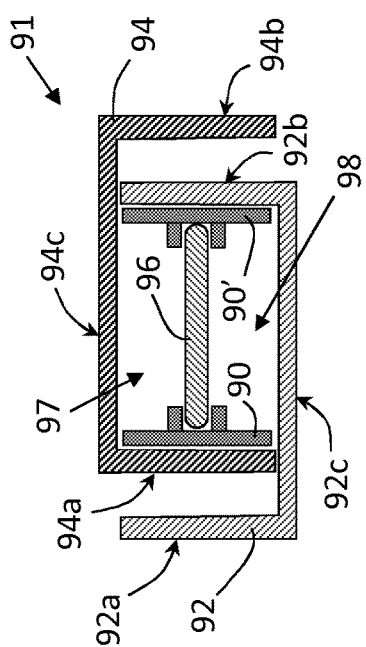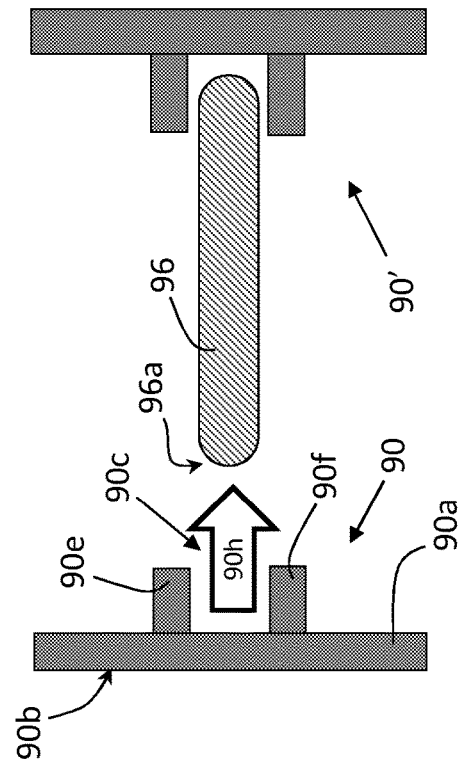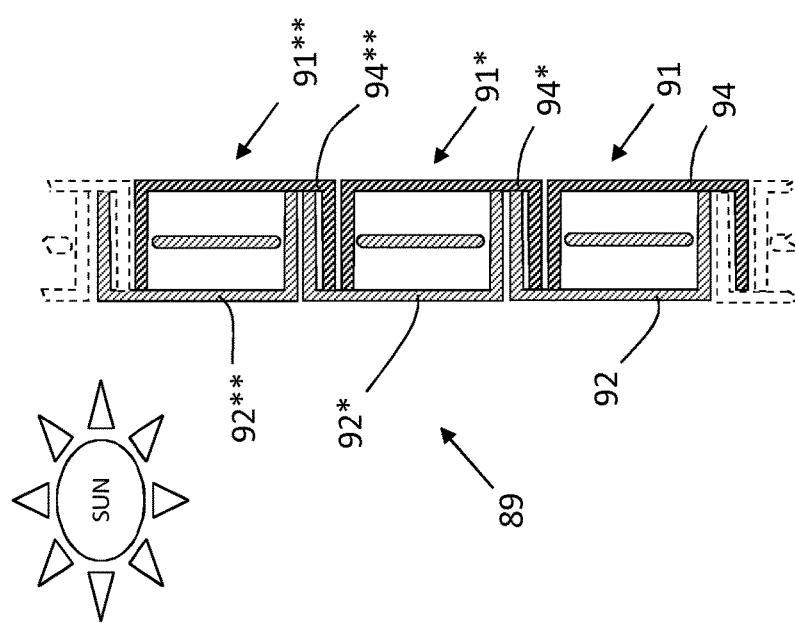

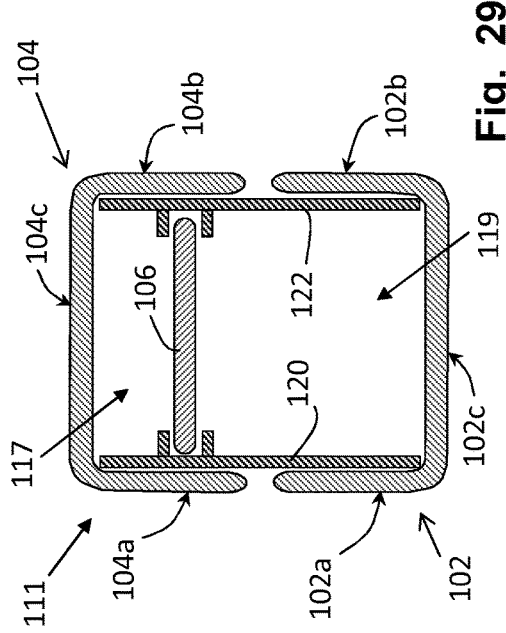
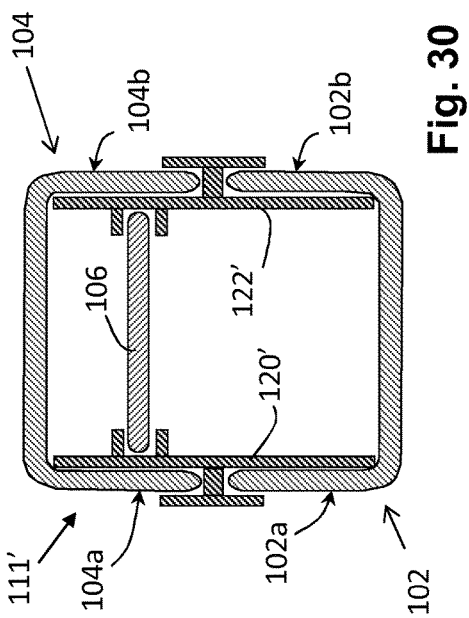
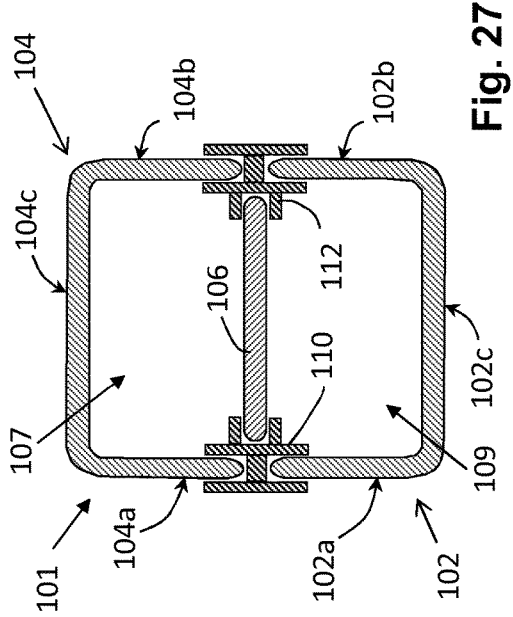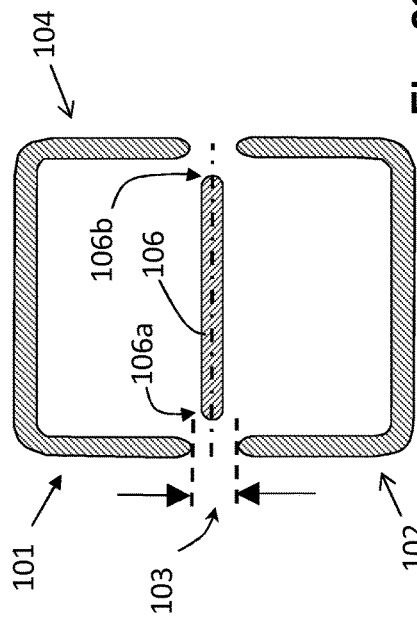

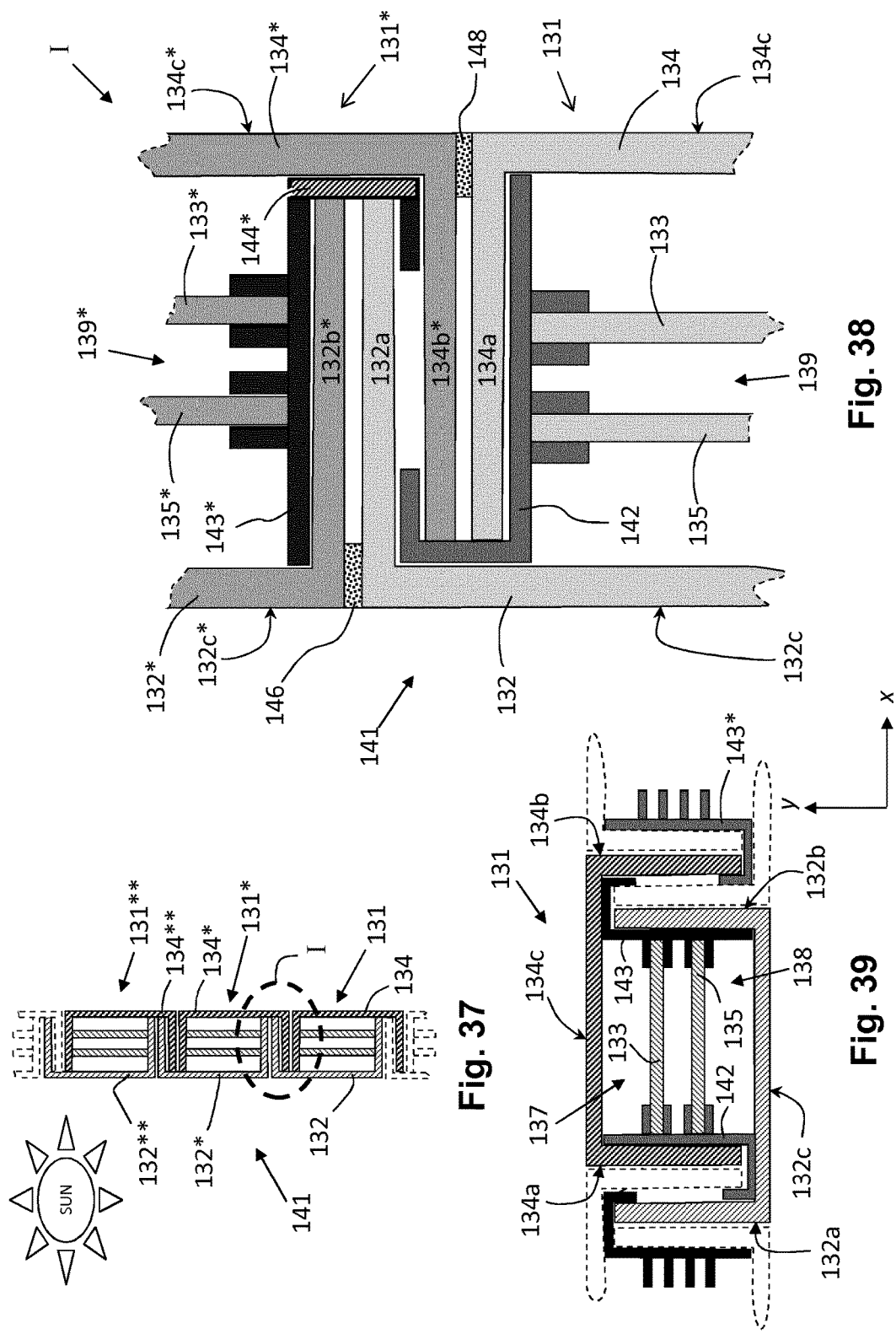

GLAZING

BACKGROUND OF THE INVENTION

The present invention relates to a glazing having first and second channel-section glazing elements with an inner glazing element therebetween, to a method of assembling a facade comprising one or more such glazings, and to a glazing pane suitable for use as an inner glazing element in such a glazing.

Glazing units comprising three spaced apart panes of glazing material are known in the art, such glazing units often being referred to as triple glazed windows. In such triple glazed windows each of the glazing elements, or panes, are usually planar sheets of glass.

Glazing elements are known having a profiled or channel-section configuration. A profiled or channel-section glazing element is made from a sheet or ribbon of glass and has at least one lateral edge bent upwards during manufacture. Usually both lateral edges are bent upwards during manufacture. Examples of making a channel-section glazing element are described in DE1496047A1. The upward facing portions of the channel-section glazing element are known in the art as "flanges" and the lower portion connected to the or each flange is known as a "web". Since channel-section glazing elements are made from a continuous glass sheet or ribbon and cut to the desired length, the flanges are a continuation of the web and are at an angle thereto. Usually the flanges are at an angle of substantially 90° to the web. A channel-section glazing element having two lateral flanges is often referred to as a U-profile glazing element because the channel-section glazing element has a U-shaped cross section.

EP 0 742 324 A1 describes a facade consisting of two rows of U-shaped glass sections, one row forming the inner skin with its bases and the other similarly forming the outer skin, such that the legs of the U's fit one inside the other. Cavities are filled with thermal insulation and a heat reflecting layer is provided on one of the outwards facing surfaces of the skins and/or the thermal insulation. The U-sections may be positioned so that they abut each other and the legs of the U-sections are joined with PVC sealing strips and/or silicone sealing members. Such glazing units have limited visible transparency due to the nature of the thermal insulation. Furthermore the facades having three U-sections described in EP 0742 324 A1 are relatively thick (the thickness of such a facade being the distance between the surface facing the exterior of a building in which the facade is installed and the surface facing the interior of the building in which the facade is installed).

WO2005/033432A1 describes a translucent glazing panel comprising: (a) a thermoplastic panel comprising (i) an outer wall having an inner surface defining an internal channel, the internal channel having an internal volume, and (ii) at least one inner wall protruding from the inner surface into the internal channel, and (b) hydrophobic aerogel particles, the hydrophobic aerogel particles being disposed within the channel. Such glazing panels are translucent and are not able to be used in applications requiring low haze.

FR1,470,375 describes glazings having two U-profiled glass elements arranged to face each other with one or two glass panes in the space between the U-profiled glass elements.

There is a need for an improved glazing unit that can be used in glazing applications where increased energy performance is required. The ability to retrofit such glazing units into existing glazing systems is desirable. The ability to be able to simplify the production and installation of such glazing units is also desirable.

Accordingly from a first aspect the present invention provides a glazing comprising a first channel-section glazing element and a second channel-section glazing element, the first and second channel-section glazing elements each comprising a web and a first flange, the first flange running along a first lateral edge of the respective web, the first and second channel-section glazing elements being arranged such that the first flange of the first channel-section glazing element faces the web of the second channel-section glazing element and the first flange of the second channel-section glazing element faces the web of the first channel-section glazing element, wherein an inner glazing element is located between a portion of the web of the first channel-section glazing element and a portion of the web of the second channel-section glazing element, the inner glazing element being adjacent the first flange of the first channel-section glazing element, further wherein there is a first space between the inner glazing element and the web of the first channel-section glazing element and a second space between the inner glazing element and the web of the second channel-section glazing element, characterised in that the inner glazing element comprises a glass glazing element.

Preferably the web of the first channel-section glazing element has a second flange running along a second lateral edge thereof, the second lateral edge of the web of the first channel-section glazing element being opposite the first lateral edge of the web of the first channel-section glazing element. Preferably the first and second flanges of the first channel-section glazing element both project in the same direction away from the web.

Preferably the web of the second channel-section glazing element has a second flange running along a second lateral edge thereof, the second lateral edge of the web of the second channel-section glazing element being opposite the first lateral edge of the web of the second channel-section glazing element. Preferably the first and second flanges of the second channel-section glazing element both project in the same direction away from the web.

In embodiments where the first channel-section glazing element has first and second flanges, preferably the first flange of the second channel-section glazing element is received in the space between the first and second flanges of the first channel-section glazing element. Preferably the first channel-section glazing element has first and second flanges and the inner glazing element extends between the first and second flanges of the first channel-section glazing element.

Preferably the second channel-section glazing element has first and second flanges and the inner glazing element extends between the first and second flanges of the first channel-section glazing element.

Preferably the first channel-section glazing element has first and second flanges and the second channel-section glazing element has first and second flanges and the inner glazing element extends between the first or second flange of the first channel-section glazing element and the first or second flange of the second channel-section glazing element.

Preferably the glazing comprises a third channel-section glazing element having a web and a first flange, wherein the third channel-section glazing element is adjacent the first channel-section glazing element such that at least a portion of the web of the third channel-section glazing element faces at least a portion of the web of the second channel section glazing element.

In embodiments of the first aspect of the present invention where the glazing comprises a third channel-section glazing element, preferably the inner glazing element is between a portion of the web of the first or second channel-section glazing element and a portion of the web of the third channel-section glazing element.

In other embodiments preferably the glass glazing element comprises a channel-section glazing element comprising a web and at least one flange. For clarity this may be referred to as an inner channel-section glazing element because this channel-section glazing element is inside the cavity defined by the inner facing surfaces of the first and second channel-section glazing elements.

As will be readily apparent, when the glass glazing element is a channel-section glazing element comprising a web and one flange, the edge of the web without a flange is usually a fire polished edge.

Preferably the at least one flange of the glass glazing element faces the web of the first channel-section glazing element or the web of the second channel-section glazing element.

Preferably the glass glazing element has a first flange portion running along a lateral edge of the web of the glass glazing element and a second flange portion running along the opposing lateral edge of the web of the glass glazing element. Preferably the first flange portion of the glass glazing element and the second flange portion of the inner glazing element point away from the web of the inner glazing element in the same direction.

The web of the glass glazing element has a first major surface and a second opposing major surface. The glazing is configured such that at least a portion of the first major surface of the web of the glass glazing element faces at least a portion of the web of the first channel-section glazing element and at least a portion of the second major surface of the web of the glass glazing element faces at least a portion of the web of the second channel-section glazing element.

Preferably there is a low emissivity coating or a solar control coating on at least a portion of the first major surface of the web of the glass glazing element.

Preferably there is a low emissivity coating or a solar control coating on at least a portion of the second major surface of the web of the inner glazing element.

Preferably there is a low emissivity coating on at least a portion of the first major surface of the web of the glass glazing element and a solar control coating on at least a portion of the second major surface of the web of the glass glazing element.

Preferably the glass glazing element is made of annealed glass. Preferably the glass glazing element is made of thermally toughened glass or chemically toughened glass.

Preferably the web and/or flange of the glass glazing element has a thickness between 4 mm and 12 mm.

The glass glazing element in the form of a channel-section glazing element may be of the type described in WO2008068324A1 When the glass glazing element is in this form, preferably the glass glazing element has one flange or two flanges.

Preferably the web of the glass glazing element is reinforced with wire.

In other embodiments preferably the glass glazing element comprises a sheet of glass. Unlike the first and second channel-section glazing elements, the sheet of glass does not have one or more flanges.

In certain embodiments, the glass sheet may be flat, curved or corrugated.

Preferably the sheet of glass is flat.
Preferably the sheet of glass is planar.

It is to be understood within the context of the present invention when a sheet of glass (or other glazing pane) is described as being "flat" or "planar" the major surfaces of the glass sheet may have certain characteristic features inherent to the forming process. For example the major surfaces of the flat glass sheet are not parallel at all points on a microscopic level, but on a macroscopic level are considered to be parallel. For example, when the sheet of glass is produced by a rolling process where a pair of cylindrical draw-in rollers disposed at the exit of a glass melting furnace are fed with molten glass and the molten glass is fed through the adjusted roller gap, it is possible for roller marks or undulations to be present on one or both major surfaces of the glass sheet so produced. However a sheet of glass produced by such a rolling process is flat or planar within the context of the present invention.

Preferably the sheet of glass has at least one fire polished edge. Preferably one of the at least one fire polished edges faces the first flange of the first channel-section glazing element or the first flange of the second channel-section glazing element.

As is known in the art, unlike the edge of freshly cut brittle material such as glass, glass ceramic etc, a fire-polished edge is not sharp. Cutting a brittle material such as glass is usually done by mechanical means, such as scoring a surface of the glass with a diamond wheel glass cutter and snapping the glass across the score line. A fire-polished edge is smooth or rounded and may be produced during the process used to form the glass sheet. Preferably the at least one fire polished edge has not been mechanically treated.

It is possible to make a rounded glass edge by edge working but this increases production times as an additional processing step is required. Such edge worked glass may be subsequently fire polished, for example by applying a burner along the edges of the glass sheet. For example the inner glazing element may comprise a sheet of flat glass cut from a sheet of float glass, the cut edges being edge worked and subsequently treated by flame to produce the fire polished edges. Additional processing steps to produce the at least one fire-polished edges are not desirable as they increase production costs and time.

The advantage in having a glass sheet with at least one fire-polished edge that has not been mechanically worked is that the glass has an improved breaking strength. Since the fire-polished edge has not been mechanically worked the fire-polished edge is stronger and cracks are less likely to propagate from the fire-polished edge, probably because no surface flaws have been introduced into the glass by mechanical processing.

Furthermore the fire polished edge helps with the assembly of the glazing because the fire-polished edge is able to be inserted into a suitable clip configured to connect the channel-section glazing elements and/or inner glazing element together.

As is known in the art, cutting a brittle material such as glass may also be carried out using one or more laser. Often a laser cut edge is higher quality than a mechanically cut edge. The disadvantage in using a laser is that additional equipment is required to produce the cut edge, thereby increasing costs and increasing complexity. Preferably the at least one fire polished edge has not been formed by using one or more laser.

Mechanical means and the use of a laser to cut glass to produce a cut edge are usually carried out after the glass has been formed. Preferably the at least one fire polished edge is produced during the process used to form the glass sheet and the at least one fire polished edge has not been mechanically treated or formed by using one or more laser.

Preferably the inner glazing element is a sheet of glass having at least one fire-polished edge Preferably the sheet of glass is a sheet of rolled glass. Preferably the sheet of glass is a sheet of rolled glass with at least one of the as-formed edges still attached. The at least one fire polished edge corresponds to the at least one still attached as-formed edge of the sheet of rolled glass.

Preferably the sheet of glass has two or more fire-polished edges. Preferably two of the two or more fire-polished edges are along opposing lateral edges of the sheet of glass.

Preferably the sheet of glass is of the type described in WO2008068324A1 but with no flanges, only a curved or corrugated web. Preferably one or both of the lateral edges of the curved or corrugated web are/is fire polished.

Preferably the sheet of glass is annealed.

Preferably the sheet of glass is thermally toughened or chemically toughened.

The sheet of glass has a first major surface and an opposing second major surface. The glazing is configured such that at least a portion of the first major surface of the sheet of glass faces at least a portion of the web of the first channel-section glazing element and at least a portion of the second major surface of the sheet of glass faces at least a portion of the web of the second channel-section glazing element.

Preferably the first and/or second major surface of the glass sheet has a pattern thereon. The pattern may be produced when the sheet of glass has been formed. The pattern may be imparted to the first and/or second major surface of the flat sheet of glass by one or more roller. When the sheet of glass has a pattern on one or both major surfaces, the sheet of glass may still be classed as being flat.

Preferably there is a low emissivity coating or a solar control coating on at least a portion of the first major surface of the glass sheet.

Preferably there is a low emissivity coating or a solar control coating on at least a portion of the second major surface of the glass sheet.

Preferably there is a low emissivity coating on at least a portion of the first major surface of the glass sheet and a solar control coating on at least a portion of the second major surface of the glass sheet.

Preferably the glass sheet has a thickness between 2 mm and 12 mm. Preferably the glass sheet has a thickness between 3 mm and 12 mm. Preferably the glass sheet has a thickness between 4 mm and 12 mm.

Preferably glass sheet is laminated to another the sheet of glazing material such as a glass sheet, a polycarbonate sheet, a sheet of PVB or sheet of PET.

Preferably the glass sheet is a ply of a laminated pane. Preferably the sheet of glass is part of a laminated panel, for example a panel comprising two sheets of soda-lime-silica glass joined by at least one ply of interlayer material such as PVB, EVA or polyurethane or other hot melt adhesive Preferably the sheet of glass is reinforced with wire.

An alternative solution to the problems identified above is provided in a second aspect of the present invention which provides a glazing comprising a first channel-section glazing element and a second channel-section glazing element, the first and second channel-section glazing elements each comprising a web, a first flange and a second flange, the first flange running along a first lateral edge of the respective web and the second flange running along a second lateral edge of the respective web, the first lateral edge of the web being opposite the second lateral edge of the web, the first and second channel-section glazing elements being arranged such that the first flange of the first channel-section glazing element faces the first flange of the second channel-section glazing element and the second flange of the first channel-section glazing element faces the second flange of the second channel-section glazing element, wherein an inner glazing element is located between a portion of the web of the first channel-section glazing element and a portion of the web of the second channel-section glazing element such that there is a first space between the inner glazing element and the web of the first channel-section glazing element and a second space between the inner glazing element and the web of the second channel-section glazing element, characterised in that the inner glazing element comprises a sheet of glass having at least one fire-polished edge.

Within the context of the present invention, it will be readily apparent that a sheet of glass having at least one fire-polished edge is a type of glass glazing element.

In a more general manner, a glazing according to the second aspect of the present invention comprises a first channel-section glazing element and a second channel-section glazing element, the first and second channel-section glazing elements each comprising a web and a first flange, the first flange running along a first lateral edge of the respective web, the first and second channel-section glazing elements being arranged such that the first flange of the first channel-section glazing element faces the second channel-section glazing element and the first flange of the second channel-section glazing element faces the first channel-section glazing element, wherein an inner glazing element is located between a portion of the web of the first channel-section glazing element and a portion of the web of the second channel-section glazing element such that there is a first space between the inner glazing element and the web of the first channel-section glazing element and a second space between the inner glazing element and the web of the second channel-section glazing element, characterised in that the inner glazing element comprises a glass glazing element being a sheet of glass having at least one fire-polished edge.

Glazings in accordance with the second aspect of the present invention may be retrofit into existing facades comprising a plurality of channel-section glazing elements.

A glazing according to the second aspect of the present invention is configured such that the first and second flanges of the first channel-section glazing element both project in the same direction away from the web of the first channel-section glazing element and the first and second flanges of the second channel-section glazing element both project in the same direction away from the web of the second channel-section glazing element.

Preferably the first flange of the first channel-section glazing element is coplanar with the first flange of the second channel-section glazing element and the second flange of the first channel-section glazing element is coplanar with the second flange of the second channel-section glazing element.

Preferably the sheet of glass extends between the first and second flanges of the first channel-section glazing element.

Preferably the sheet of glass extends between the first and second flanges of the second channel-section glazing element.

Preferably the first and second channel-section glazing elements are separated by a gap and the inner glazing element is positioned in the gap.

Unlike the first and second channel-section glazing elements, the sheet of glass having at least one fire polished edge does not have one or more flanges.

Preferably the sheet of glass is flat or planar.

Preferably the sheet of glass is of the type described in WO2008068324A1 but with no flanges, only a curved or corrugated web. Preferably one or both of the lateral edges of the curved or corrugated web are/is fire polished.

Preferably the at least one fire polished edge has not been formed by using one or more laser.

Preferably the at least one fire polished edge is produced during the process used to form the glass sheet and the at least one fire polished edge has not been mechanically treated or formed by using one or more laser.

Preferably the inner glazing element is a sheet of glass having at least one fire-polished edge Preferably the sheet of glass is a sheet of rolled glass. Preferably the sheet of glass is a sheet of rolled glass with at least one of the as-formed edges still attached. The at least one fire polished edge corresponds to the at least one still attached as-formed edge of the sheet of rolled glass.

Preferably the sheet of glass has two or more fire-polished edges. Preferably two of the two or more fire-polished edges are along opposing lateral edges of the sheet of glass.

Preferably the sheet of glass is annealed.

Preferably the sheet of glass is thermally toughened or chemically toughened.

The sheet of glass has a first major surface and an opposing second major surface. The glazing is configured such that at least a portion of the first major surface of the sheet of glass faces at least a portion of the web of the first channel-section glazing element and at least a portion of the second major surface of the sheet of glass faces at least a portion of the web of the second channel-section glazing element.

Preferably the first and/or major surface of the glass sheet has a pattern thereon. The pattern may be produced when the sheet of glass has been formed. The pattern may be imparted to the first and/or second major surface of the flat sheet of glass by one or more roller. When the sheet of glass has a pattern on one or both major surfaces, the sheet of glass may still be classed as being flat.

Preferably there is a low emissivity coating or a solar control coating on at least a portion of the first major surface of the glass sheet.

Preferably there is a low emissivity coating or a solar control coating on at least a portion of the second major surface of the glass sheet.

Preferably there is a low emissivity coating on at least a portion of the first major surface of the glass sheet and a solar control coating on at least a portion of the second major surface of the web of the glass sheet.

Preferably the glass sheet has a thickness between 2 mm and 12 mm. Preferably the glass sheet has a thickness between 3 mm and 12 mm. Preferably the glass sheet has a thickness between 4 mm and 12 mm.

Preferably glass sheet is laminated to another the sheet of glazing material such as a glass sheet, a polycarbonate sheet, a sheet of PVB or sheet of PET.

Preferably the glass sheet is a ply of a laminated pane. Preferably the sheet of glass is part of a laminated panel, for example a panel comprising two sheets of soda-lime-silica glass joined by at least one ply of interlayer material such as PVB, EVA or polyurethane or other hot melt adhesive Preferably the sheet of glass is reinforced with wire.

Preferably the sheet of glass has two or more fire-polished edges. Preferably two of the two or more fire-polished edges are along opposing lateral edges of the sheet of glass.

In a glazing according to either the first or second aspect of the present invention, preferably the first channel-section glazing element and/or the second channel-section glazing element and/or the inner glazing element comprises glass having a soda-lime-silica glass composition. A typical soda-lime-silica glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%; $Fe_2O_3$ 0.005-2%. The glass composition may also contain other additives, for example, refining aids, which would normally be present in an amount of up to 2%. The soda-lime-silica glass composition may contain other colouring agents such as $Co_3O_4$, $NiO$ and $Se$ to impart to the glass a desired colour when viewed in transmitted light. The transmitted glass colour may be measured in terms of a recognised standard such as BS EN410.

Tinted flat glass sheets, with or without solar control coatings and/or low emissivity coatings thereon, are sold as items of commerce.

The overall transmitted colour of the glazing of the first or second aspect of the present invention may be determined by contributions from the first and/or second channel-section glazing elements as well as the inner glazing element.

Preferably the inner glazing element comprises glass having a borosilicate glass composition.

A glazing according to the first and second aspect of the present invention has an improved energy performance when compared to the same glazing without an inner glazing element. Such a glazing can be retrofit into existing installations to improve the energy performance thereof.

In the first and second aspects of the present invention the web of the first channel-section glazing element has a first major surface and a second opposing major surface. Preferably at least a portion of the first and/or second major surface of the web of the first channel-section glazing element has a coating thereon. Preferably the coating is a low emissivity coating. Preferably the coating is a solar control coating.

In the first and second aspects of the present invention the web of the second channel-section glazing element has a first major surface and a second opposing major surface. Preferably at least a portion of the first and/or second major surface of the web of the second channel-section glazing element has a coating thereon. Preferably the coating is a low emissivity coating. Preferably the coating is a solar control coating. In some embodiments of the first and second aspects of the present invention, the web of the first and/or second channel-section glazing element is curved or corrugated, for example as in the channel-section glazing elements described in WO2008068324A1.

In certain embodiments, the inner glazing element and/or the first channel-section glazing element and/or the second channel-section glazing element comprises annealed glass, chemically toughened glass or thermally toughened glass.

In a most preferred embodiment of the first and second aspects of the present invention, the first channel-section glazing element is made of annealed glass and not thermally toughened glass, the second channel section glazing element is made of annealed glass and not thermally toughened glass and the glass glazing element is made of toughened glass and not annealed glass.

In other embodiments of the first and second aspects of the present invention, the first channel-section glazing element is made of annealed glass and not thermally toughened glass, the second channel section glazing element is made of annealed glass and not thermally toughened glass and the inner glazing element is a sheet of glass glazing made of annealed glass and not thermally toughened glass.

Glazings in accordance with the first aspect and second aspects of the present invention have other preferable features.

Preferably the glass glazing element has a first major surface and a second opposing surface, the first major surface of the glass glazing element facing the web of the first channel-section glazing element and the second major surface of the glass glazing element facing the web of the second channel-section glazing element.

Preferably the inner glazing element has a first major surface and a second opposing major surface. Preferably the first major surface of the inner glazing element and the second major surface of the inner glazing element are not separated by an air space.

Preferably the first and/or second channel-section glazing element is coated over at least a portion thereof to provide the respective channel-section glazing element with a region having a different colour in reflected or transmitted light compared to the uncoated channel-section glazing element. Such a coating may be optically opaque. Suitably the coating is a paint.

Preferably the inner glazing element is optically transparent.

Preferably the inner glazing element does not comprise an aerogel.

Preferably the inner glazing element does not comprise a nano aerogel.

Preferably the inner glazing element is monolithic.

Preferably the inner glazing element has a haze of less than 10%, more preferably less than 5%, even more preferably between 0 and 5%, most preferably between 0 and 4%, or 0 and 3%, or 0 and 2%.

Preferably the first and/or second channel-section glazing element is optically transparent.

Preferably the first and/or second channel-section glazing element is laminated, for as example of the type described in EP2752292A1.

Preferably the web of the first and/or second channel-section glazing element has a thickness between 4 mm and 12 mm, more preferably between 5 mm and 8 mm.

Preferably the or each flange of the first and/or second channel-section glazing element has a thickness of between 4 mm and 12 mm, more preferably between 5 mm and 8 mm.

Preferably the thickness of the web of the first channel-section glazing element is the same as the thickness of the or each flange of the first channel-section glazing element.

Preferably the thickness of the web of the second channel-section glazing element is the same as the thickness of the or each flange of the first channel-section glazing element.

Preferably the thickness of the web of the second channel-section glazing element is the same as the thickness of the or each flange of the second channel-section glazing element.

Suitable coatings that may be useful with glazings according to the present invention include low-emissivity coatings, conductive coatings and solar control coatings. A low emissivity coating is a coating which when applied to clear, 3 mm thick float glass, results in the coated glass having an emissivity in the range of 0.05 to 0.45, the actual value being measured in accordance with EN 12898 (a published standard of the European Association of Flat Glass Manufacturers).

Typical solar control coatings comprise layers of silver or tin oxide, and control the amount of heat absorbed through the coated glass. Solar control and low emissivity coatings may also be electrically conductive, and so not only provide functionality to the glass in terms of emissivity and heat transmission, but can form an electrically conductive substrate for mounting electrically conductive devices.

Such coatings may be applied using techniques known in the art, for example atmospheric pressure chemical vapour deposition or spray pyrolysis.

In the first aspect of the present invention when the first and/or second channel-section glazing element has two flanges, and in the second aspect of the present invention, preferably the thickness of each flange of the first and/or second channel-section glazing element is the same.

In some embodiments of the first and second aspects of the present invention, the inner glazing element is located between a first clip and a second clip, the first clip and/or second clip comprising an elongate member having a first major surface and a second opposing major surface, there being a slot associated with the first major surface of the elongate member, the slot being configured to receive at least a portion of an edge of the inner glazing element.

Preferably the second major surface of the elongate member of the clip is configured to be positioned adjacent a flange of a channel-section glazing element.

Preferably the first and/or second clip comprises a second slot configured to receive at least a portion of a flange of a channel-section glazing element. Preferably the first slot is substantially orthogonal to the second slot.

Preferably the first and/or second clip comprises a third slot configured to receive at least a portion of a flange of a channel-section glazing element.

Preferably the third slot is orthogonal to the first slot.

Preferably the third slot is opposite the second slot.

Preferably the second major surface of the elongate member comprises a male element configured to be engaged with a female element associated with an adjacent clip.

In certain embodiments, the first and/or second clip has a fourth slot adjacent the first slot, the fourth slot being associated with the first major surface of the elongate member of the respective clip and being configured to receive at least a portion of an edge of a sheet of glazing material.

Other embodiments of the first and second aspects of the present invention have other preferable features.

In a preferred embodiment of the first and/or second aspect of the present invention the inner glazing element comprises at least two glazing panes (a first glazing pane and a second glazing pane) separated by at least one space (a first space), the inner glazing element being arranged such that there is a second space between the first glazing pane and the web of the first channel-section glazing element and a third space between the second glazing pane and the web of the second channel-section glazing element, further wherein the first glazing pane comprises the glass glazing element and the second glazing pane comprises a first sheet of glazing material.

It will be readily understood that in the second aspect of the present invention the sheet of glass having at least one fire polished edge is a glass glazing element.

Preferably the first glazing pane and/or the second glazing pane are/is curved in at least one direction. Preferably the radius of curvature in the at least one direction is between 500 mm and 20000 mm, more preferably between 1000 mm and 8000 mm.

Preferably the first glazing pane and/or the second glazing pane are/is part of an insulated glazing unit.

Preferably the first glazing pane and/or the second glazing pane are/is part of a laminate.

Preferably the first glazing pane has the same configuration as the second glazing pane.

Preferably the first glazing pane and/or the second glazing pane are/is a single sheet.

Preferably the inner glazing element comprises a third glazing pane, the third glazing pane being arranged such that there is a fourth space between the second glazing pane and the third glazing pane.

Preferably the first glazing pane and/or second glazing pane comprise one or more further sheets of glazing material.

Preferably the or at least one of the further sheets of glazing material is a sheet of glass or a sheet of plastic. Preferably each of the further sheets of glazing material is a sheet of glass or a sheet of plastic.

Preferably the first glazing pane and/or second glazing pane comprise a laminate comprising at least one (a first) ply and an interlayer structure comprising at least one sheet of interlayer material. When the first glazing pane comprises a laminate, the first sheet of glass corresponds to the first ply of the laminate of the first glazing pane. Likewise, when the second glazing pane comprises a laminate, the first sheet of glazing material corresponds to the first ply of the laminate of the second glazing pane.

Preferably the or each laminate comprises a second ply joined to the first ply by the interlayer structure. Preferably the second ply comprises a glass sheet or a plastic sheet.

Preferably the interlayer structure comprises at least one sheet of thermoplastic material. Preferably the thermoplastic material comprises polyvinyl butyral, ethylene vinyl acetate copolymer, polyurethane, polycarbonate, poly vinyl chloride or a copolymer of ethylene and methacrylic acid.

Preferably the interlayer structure comprises at least one sheet of interlayer material formed by means of curing a solution, such as a water-glass solution or a UV-curable liquid resin.

Preferably the first glazing pane is a first pane of a first insulated glazing unit. The first pane of the first insulated glazing unit is joined to a second pane of the first insulated glazing unit by a perimeter seal. Preferably the second pane of the first insulated glazing unit comprises the second glazing pane. Preferably the second pane of the first insulated glazing unit comprises a glass sheet or a plastic sheet. The first insulated glazing unit may comprise three or more panes of glazing material.

Preferably the first glazing pane is a single sheet of glass.

Preferably the first glazing pane and/or second glazing pane is/are a channel-section glazing element comprising a web and at least one flange. For clarity, such a channel-section glazing element shall hereinafter be referred to as an inner channel-section glazing element.

Preferably the or each inner channel-section glazing element has a first flange portion running along a lateral edge of the respective web thereof and a second flange portion running along the opposing lateral edge of the respective web thereof.

Preferably the first flange portion of the or each inner channel-section glazing element and the second flange portion of the or each inner channel-section glazing element point away from the web of the or each respective inner channel-section glazing element in the same direction.

Preferably the or each inner channel-section glazing element is a laminate.

Preferably the first sheet of glazing material is a single sheet of glazing material, preferably glass or plastic.

When the inner glazing element comprises a first sheet of glass and a first sheet of glazing material, a glazing according to the first or second aspect of the present invention has other preferable features.

Preferably the first sheet of glass and/or the first sheet of glazing material has a thickness between 2 mm and 12 mm. Preferably the first sheet of glass and/or first sheet of glazing material has a thickness between 3 mm and 12 mm. Preferably the first sheet of glass and/or first sheet of glazing material has a thickness between 4 mm and 12 mm.

Preferably the first sheet of glass has at least one fire-polished edge. Preferably the first sheet of glass has a first fire-polished edge and a second fire-polished edge.

Preferably the first sheet of glazing material is a glass sheet having at least one fire-polished edge. Preferably the first sheet of glazing material has a first fire-polished edge and a second fire-polished edge.

Suitable glazing material includes annealed glass, thermally toughened glass and chemically strengthened glass.

Other suitable glazing material includes plastic, for example polycarbonate.

Preferably the first sheet of glass and/or first sheet of glazing material has a soda-lime-silica glass composition.

Preferably the first and/or second channel-section glazing elements comprise glass, more preferably a glass having a soda-lime-silica glass composition.

Preferably the first sheet of glass and/or first sheet of glazing material has a borosilicate glass composition.

Preferably the first sheet of glass and/or first sheet of glazing material is reinforced with wire.

The first sheet of glass, the first sheet of glazing material, the web of the first channel-section glazing element and the web of the second channel-section glazing element each have a first major surface and a second opposing major surface.

Preferably at least a portion of the first and/or second major surface of at least one of the first sheet of glass, the first sheet of glazing material, the web of the first channel-section glazing element or the web of the second channel-section glazing element has a pattern thereon.

Preferably at least a portion of the first and/or second major surface of at least one of the first sheet of glass, the first sheet of glazing material, the web of the first channel-section glazing element or the web of the second channel-section glazing element has a low emissivity coating thereon.

Preferably at least a portion of the first and/or second major surface of at least one of the first sheet of glass, the first sheet of glazing material, the web of the first channel-section glazing element or the web of the second channel-section glazing element has a solar control coating thereon.

Preferably at least a portion of the first major surface of at least one of the first sheet of glass, the first sheet of glazing material, the web of the first channel-section glazing element or the web of the second channel-section glazing element has a solar control coating thereon and at least a portion of the second major surface of at least one of the first sheet of glass, the first sheet of glazing material, the web of the first channel-section glazing element or the web of the second channel-section glazing element has a low emissivity coating thereon.

Preferably first glazing pane and/or second glazing pane and/or first sheet of glass and/or first sheet of glazing material is flat or planar.

In a preferred embodiment of the second aspect of the present invention a first sheet of glass extends between the first and second flanges of the first channel-section glazing element and a first sheet of glazing material extends between the first and second flanges of the second channel-section glazing element.

In embodiments having a sheet of glass, preferably the length of the sheet of glass is ten times the width of the sheet of glass.

Preferably the width of the sheet of glass is in the range 5 cm to 100 cm, more preferably 10 cm to 80 cm, even more preferably 10 cm to 70 cm.

Preferably the length of the sheet of glass is in the range 2 m to 10 m, more preferably 3 m to 8 m, even more preferably less than 7 m.

Preferably the sheet of glass has a thickness between 2 mm and 10 mm, more preferably 3 mm and 8 mm.

In some embodiments having a sheet of glass and a first sheet of glazing material, preferably the sheet of glass and/or first sheet of glazing material is located between a first clip and a second clip, the first clip and/or second clip comprising an elongate member having a first major surface and a second opposing major surface, there being a first slot associated with the first major surface of the elongate member of the respective clip, the first slot of the respective clip being configured to receive at least a portion of an edge of the first sheet of glass or first sheet of glazing material.

Preferably the first and/or second clip comprises a second slot being configured to receive at least a portion of an edge of the first sheet of glass or first sheet of glazing material.

Preferably the second major surface of the elongate member is configured to be positioned adjacent a flange of a channel-section glazing element.

Preferably the first and/or second clip comprises a third slot configured to receive at least a portion of a flange of a channel-section glazing element, preferably the first and/or second channel section glazing element. Preferably the first slot is substantially orthogonal to the third slot.

Preferably the second major surface comprises a male element configured to be engaged with a female element associated with an adjacent clip.

The present invention also provides an assembly for making a glazing according to the present invention, the assembly comprising at least one clip, the or each clip having an elongate member having a first major surface and a second opposing major surface, there being a first slot associated with the first major surface of the elongate member, the first slot being configured to receive at least a portion of the inner glazing element, preferably the first sheet of glass or the first sheet of glazing material.

Preferably the or each clip has a second slot associated with the first major surface of the elongate member, the second slot being configured to receive at least a portion of the inner glazing element.

As will be appreciated by a person skilled in the art, glazings according to the first and second aspects of the present invention comprise first and second channel-section glazing elements arranged to define a cavity in which is located an inner glazing element comprising a glass glazing element, in particular a soda-lime-silica glass sheet, channel-section glazing element or sheet of rolled glass having at least one fire polished edge. The inner glazing element divides the cavity into at least two spaces to improve the thermal and/or noise performance of the glazing. By using low emissivity coatings on one or more major surfaces of one or more of the glazing elements, the thermal performance may be further improved. Mechanical performance may be modified by the particular type of inner glazing element used. It is possible to retrofit existing glazings to improve the thermal and/or noise performance thereof.

Glazings in accordance with the first aspect of the present invention may be retrofit into existing facades comprising a plurality of channel-section glazing elements.

Accordingly from another aspect the present invention provides a facade for a building comprising a plurality of glazings in accordance with the first and/or second aspect of the present invention.

From a third aspect the present invention provides a method of assembling a facade comprising the steps:

(a) providing a frame for connection with a glazing according to the first aspect of the present invention;

(b) inserting the first channel-section glazing element into the frame;

(c) inserting the inner glazing element into the frame to face the first channel-section glazing element, and positioning the inner glazing element to be adjacent the first flange of the first channel-section glazing element; and (d) inserting the second channel-section glazing element into the frame such that the first flange of the first channel-section glazing element faces the web of the second channel-section glazing element and the first flange of the second channel-section glazing element faces the web of the first channel-section glazing element.

Upon completion of the above steps, one glazing according to the first aspect of the present invention is positioned in the frame.

The above steps (a) to (d) may be repeated to incorporate additional glazings according to the first aspect of the present invention in the frame.

When two or more glazings in accordance with the first aspect of the present invention are incorporated in the frame, the method preferably includes a step of applying a sealant between the longitudinal edges of adjacent first and/or second channel-section glazing elements.

Preferably the facade is for a building.

From a fourth aspect the present invention provides an assembly for making a glazing according to the first or second aspect of the present invention, the assembly comprising an inner glazing element comprising a sheet of glass having at least one fire-polished edge and a first clip or a first clip and a second clip, the first and/or second clip having an elongate member having a first major surface and a second opposing major surface, there being a first slot associated with the first major surface of the elongate member, the slot being configured to receive at least a portion of the fire polished edge of the inner glazing element.

A fire polished edge is able to fit into a slot in a clip more easily than an edge having sharp corners.

Preferably the first and/or second clip comprises a second slot configured to receive at least a portion of a flange of a channel-section glazing element.

Preferably the first slot is substantially orthogonal to the second slot.

Preferably the first and/or second clip comprises a third slot configured to receive at least a portion of a flange of a channel-section glazing element. Preferably the third slot is orthogonal to the first slot. Preferably the third slot is opposite the second slot.

Preferably the second major surface of the elongate member of the first and/or second clip is configured to be positioned adjacent a flange of a channel-section glazing element.

Preferably the second major surface of the elongate member of the first and/or second clip comprises a male element configured to be engaged with a female element associated with the male element of an adjacent clip.

From a fifth aspect the present invention provides a glazing pane having a first cut edge and a second cut edge and a first fire polished edge and a second fire polished edge, the glazing pane having a length and a width wherein the length is at least ten times greater than the width, further wherein the glazing pane does not have a flange.

Preferably the first fire polished edge runs along the length of the glazing pane and the first cut edge runs along the width of the glazing pane.

Preferably the glazing pane is flat, or substantially flat.

Preferably the glazing pane is planar, or substantially planar.

Preferably the glazing pane is curved.

Preferably the glazing pane has a thickness between 2 mm and 8 mm.

Preferably the glazing pane has a thickness between 3 mm and 8 mm.

Preferably the glazing pane has a rectangular outline where the first cut edge is opposite the second cut edge and the first fire-polished edge is opposite the second fire-polished edge.

Preferably the first and second fire polished edges run along the length of the glazing pane along opposite edges thereof.

Preferably the first and second cut edges run along the width of the glazing pane along opposite edges thereof.

Preferably the variation of the thickness of the glazing pane across the width is less than ±0.4 mm, preferably ±0.3 mm, even more preferably ±0.2 mm.

Preferably the variation of the thickness of the glazing pane along the length is less than ±0.4 mm, preferably ±0.3 mm, even more preferably ±0.2 mm.

Preferably the width of the glazing pane along the length of the glazing pane varies by less than ±2 mm, preferably ±1.5 mm, more preferably ±1.0 mm, even more preferably ±0.5 mm.

Preferably the glazing pane has a soda-lime-silica glass composition.

A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. The glass may also contain other additives, for example, refining aids, which would normally be present in an amount of up to 2%. The glass composition may also contain other additives, for example, refining aids, which would normally be present in an amount of up to 2%. The soda-lime-silica glass composition may contain other colouring agents such as $Co_3O_4$, NiO and Se to impart to the glass a desired colour when viewed in transmitted light. The transmitted glass colour may be measured in terms of a recognised standard such as BS EN410.

Preferably the glazing pane has a borosilicate glass composition.

Preferably the glazing pane is thermally toughened glass or chemically toughened glass or annealed glass.

Preferably the glazing pane is produced by forming molten glass between a pair of spaced apart rollers into a continuous ribbon, the continuous ribbon having two opposed fire polished edges substantially parallel to the direction of travel of the ribbon, wherein the glazing pane is cut from the continuous ribbon by a first cut extending between the two fire polished edges and a second cut after the first cut and also extending between the two fire polished edges, the distance between the first and second cuts defining the length of the glazing pane and the distance between the two fire polished edges in between the two cut edges defining the width of the glazing pane.

Preferably the first fire polished edge runs along the length of the glazing pane.

Preferably the second fire polished edge runs along the length of the glazing pane.

Preferably the first cut edge runs across the width of the glazing pane.

Preferably the second cut edge runs across the width of the glazing pane.

When the or each clip has first and second slots, preferably the first slot is configured to receive at least a portion of the first sheet of glass and the second slot is configured to receive at least a portion of the first sheet of glazing material.

BRIEF DESCRIPTION OF THE DRAWINGS

The invention will now be described with reference to the following figures (not to scale) in which.

FIG. 7 is a cross-sectional view of a facade comprising three glazings of the type shown in FIG. 4;

FIG. 8 is a cross-sectional view of a facade comprising two glazings of the type shown in FIG. 6 and one of the type shown in FIG. 4;

FIG. 10 is a cross-sectional view of a facade comprising three glazings of the type shown in FIG. 9;

FIG. 12 is a cross-sectional view of a facade comprising three glazings of the type shown in FIG. 11;

FIG. 24 is a cross-sectional view of a facade comprising three glazings of the type shown in FIG. 23;

FIG. 25 is a cross-sectional view of the glazing shown in FIG. 23 where the glass sheet is located between two clips;

FIG. 26 is a portion of the glazing shown 25;

FIG. 27 is a cross-sectional view of a glazing according to the second aspect of the present invention;

FIG. 28 is a view of the glazing shown in FIG. 27 with the clips removed;

FIGS. 29 and 30 show cross-sectional views of other glazing according to the present invention;

FIG. 37 is a cross-sectional view of a facade comprising three glazings of the type shown in FIG. 35;

FIG. 38 is an enlarged view of a portion of the facade shown in FIG. 37;

FIG. 39 is another view of a portion of the facade shown in FIG. 37;

DETAILED DESCRIPTION OF THE INVENTION

Figure 1:
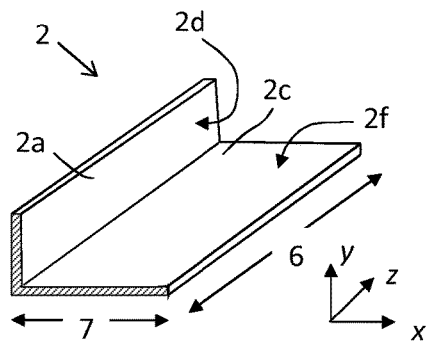
FIG. 1 is an isometric projection of a channel-section glazing element having only one flange continuous with a web.

FIG. 1 shows a perspective view of one type of channel-section glazing element 2 that may be used in making a glazing in accordance with the first aspect of the present invention. The channel-section glazing element 2 has a flange 2a and a web 2c. The flange 2a is continuous with the web 2c and the channel-section glazing element 2 has been bent from an initially flat sheet or ribbon of glass, for example as described in DE1496047A1. The width 7 of the web may be many cm, whereas the length 6 of the web may be many tens of cm, up to several meters.

The flange 2a has a first major surface 2d and an opposing second major surface 2e (not indicated in the figure). The web 2c has a first major surface 2f and an opposing second major surface 2g (not indicated in the figure).

The flange 2a is substantially perpendicular to the web 2c. The web 2c has a thickness of 7 mm. The flange 2a has a thickness of 7 mm.

Figure 2:
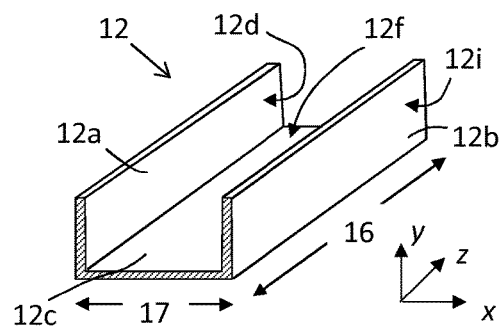
FIG. 2 is an isometric projection of a channel-section glazing element having a web and two flanges continuous with the web.

FIG. 2 shows a perspective view of another type of channel-section glazing element 12 that may be used in making a glazing in accordance with the first and/or second aspect of the present invention.

The channel-section glazing element 12 has a first flange 12a, a second flange 12b and a web 12c. The flanges 12a, 12b are continuous with the web 12c and the channel-section glazing element 12 has been bent from an initially flat sheet or ribbon of glass, for example as described in DE1496047A1. The width 17 of the web may be many cm, whereas the length 16 of the web may be many tens of cm, up to several meters.

The first flange 12a has a first major surface 12d and an opposing second major surface 12e (not indicated in the figure). The second flange 12b has a first major surface 12h (not indicated in the figure) and an opposing second major surface 12i. The web 12c has a first major surface 2f and an opposing second major surface 12g (not indicated in the figure). The surface 12d of the first flange 12a faces the surface 12h of the second flange 12b.

The flanges 12a, 12b are each substantially perpendicular to the web 12c. The web 12c has a thickness of 7 mm. The flanges 12a, 12b each have a thickness of 7 mm.

Figure 3:
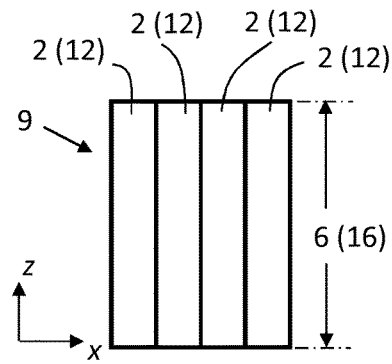
FIG. 3 is a front view of a part of a facade for a building comprising four channel-section glazing elements.

FIG. 3 shows a front view of part of a facade 9 for a building comprising four channel-section glazing elements of the type described with reference to FIG. 1 or FIG. 2. With reference to FIG. 1 and FIG. 2, the facade is viewed in the direction of the y-axis.

As is known in the art, each channel-section glazing element 2 or 12 is arranged vertically in a supporting frame or mounting frame (not shown). For each channel-section glazing element 2 or 12 in the facade there may be suitable sealant material in between adjacent longitudinal edges.

The facade 9 may alternatively comprise horizontally orientated channel-section glazing elements.

Figure 4:
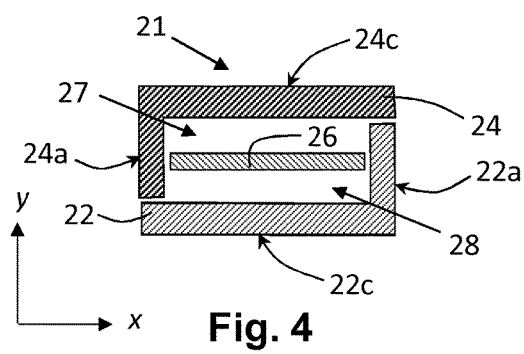
FIG. 4 is a cross-sectional view of glazing according to the first aspect of the present invention.

FIG. 4 shows a cross-sectional view of a glazing 21 in accordance with the first aspect of the present invention. With reference to FIG. 1, this is a view in the direction of the z-axis.

The glazing 21 has a first channel-section glazing element 22 of annealed glass. The first channel-section glazing element 22 has a flange 22a and a web 22c. The flange 22a is continuous with the web 22c and the first channel-section glazing element has been bent from an initially flat sheet or ribbon of glass, for example as described in DE1496047A1.

The flange 22a is substantially perpendicular to the web 22c. The web 2c has a thickness of 7 mm. The flange 2a has a thickness of 7 mm.

The glazing 21 also has a second channel-section glazing element 24 of annealed glass. The second channel-section glazing element 24 has a flange 24a and a web 24c. The flange 24a is continuous with the web 24c and the first channel-section glazing element has been bent from an initially flat sheet or ribbon of glass, for example as described in DE1496047A1.

The flange 24a is substantially perpendicular to the web 24c. The web 24c has a thickness of 7 mm. The flange 24a has a thickness of 7 mm.

The second channel-section glazing element has substantially the same dimensions as the first channel-section glazing element.

The first and second channel-section glazing elements are arranged such that the flange 22a of the first channel-section glazing element faces 22 faces the web 24c of the second channel-section glazing element 24, and the flange 24a of the second channel-section glazing element 24 faces the web 22c of the first channel-section glazing element 22. In this arrangement the inner facing surfaces of the channel-section glazing elements 22, 24 define a cavity.

There may be a low emissivity coating on a surface of the web 22c and/or 24c facing into the cavity.

In accordance with the present invention a glazing element is located in the cavity defined by the inner facing surfaces of the channel-section glazing elements 22, 24.

Located between the web 22c and the web 24c is an inner glazing element 26. The inner glazing element 26 is a sheet of flat glass having a length the same as that of the channel-section glazing elements 22, 24. The width of the inner glazing element is slightly less than the distance between the inner surfaces of the flanges 22a, 24a. The thickness of the glazing element 26 is about 8 mm. In this particular example of the invention the glazing element is a sheet of thermally toughened glass.

The inner glazing element 26 is located between the flange 22a of the first channel-section glazing element 22 and the flange 24a of the second channel-section glazing element 24. As a result, the inner glazing element 26 is adjacent the flange 22a and also adjacent the flange 24a. In relation to the orientation of the glazing shown in FIG. 4, the left hand edge of the inner glazing element 26 is adjacent to the flange 24a and the right hand edge of the inner glazing element 26 is adjacent the flange 22a. There may be a clip between the left hand edge of the inner glazing element 26 and the flange 24a. There may be a clip between the right hand edge of the inner glazing element 26 and the flange 22a. Suitable clips are described hereinafter, for example in relation to FIG. 25.

With respect to the orientation of the glazing 21 as shown in FIG. 4, there is an upper space 27 between the web 24c and the inner glazing element 26 and a lower space 28 between the inner glazing element 26 and the web 22c.

The inner glazing element 26 divides the cavity defined by the inner facing surfaces of the channel-section glazing elements 22, 24 into two airspaces. This improves noise insulation. The glazing 21 also has improved thermal insulation properties (compared to the same arrangement without the inner glazing element 26).

On the major surface of the inner glazing element 26 that faces the web 22c there may be a low emissivity coating thereon.

On the major surface of the inner glazing element 26 that faces the web 24c there may be a low emissivity coating thereon.

There may be a low emissivity coating on the major surface of the inner glazing element 26 that faces the web 24c and a solar control coating on the major surface of the inner glazing element 26 that faces the web 22c. Alternatively there may be a solar control coating on the major surface of the inner glazing element 26 that faces the web 24c and a low emissivity coating on the major surface of the inner glazing element 26 that faces the web 22c.

Figure 5:
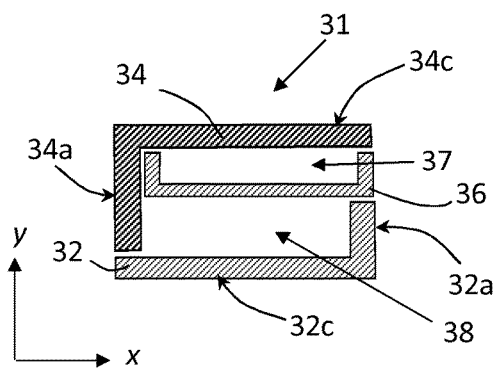
FIG. 5 is a cross-sectional view of another glazing according to the first aspect of the present invention.

FIG. 5 shows a cross-sectional view of another glazing 31 in accordance with the first aspect of the present invention. With reference to FIG. 1, this is a view in the direction of the z-axis.

The glazing 31 has a first channel-section glazing element 32 of annealed glass. The first channel-section glazing element 22 has a flange 32a and a web 32c.

The glazing 31 also has a second channel-section glazing element 34 of annealed glass. The second channel-section glazing element 34 also has a flange 34a and a web 34c. The flange 34a is taller than the flange 32a i.e. the flange 34a extends a greater distance from the web 34c than the flange 32a extends from the web 32c.

Located between the web 32c and the web 34c is an inner glazing element 36. In this example the inner glazing element 36 is a glass channel-section glazing element having a web and two flanges (of the type shown in FIG. 2). The flanges of the inner glazing element 36 face the web 34c of the second channel-section glazing element 34.

The length of the inner glazing element 36 is substantially the same as that of the channel-section glazing elements 32, 34. The width of the inner glazing element is slightly less than the distance between the inner surface of the flange 34a and the outer surface of the flange 32a. The thickness of the web of the glazing element 36 is about 8 mm. In this particular example of the invention the glazing element 36 is a made of thermally toughened glass.

With respect to the orientation of the glazing 31 as shown in FIG. 5, there is an upper space 37 between the web 34c and the inner glazing element 36 and a lower space 38 between the inner glazing element 36 and the web 32c.

As in the example shown in FIG. 4, the glazing 31 has two airspaces between the webs that help improve noise insulation. The glazing 31 also has improved thermal insulation properties (compared to the same arrangement without the inner glazing element 36).

The web of the inner glazing element has a first major surface and an opposing second major surface. There may be a low emissivity coating on the first and/or second major surface of the web of the inner glazing element.

There may be a low emissivity coating or a solar control coating on the surface of the web 32c facing the inner glazing element 36.

There may be a low emissivity coating or a solar control coating on the surface of the web 34c facing the inner glazing element 36.

Figure 6:
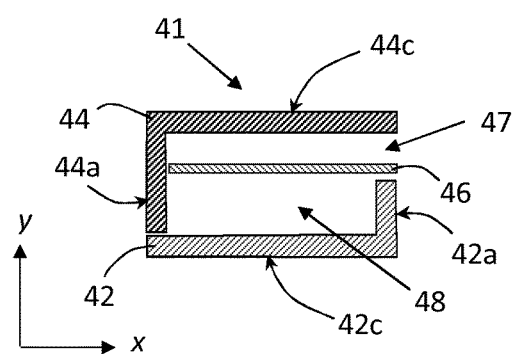
FIG. 6 is a cross-sectional view of another glazing according to the first aspect of the present invention.

FIG. 6 shows a cross-sectional view of another glazing 41 in accordance with the present invention. With reference to FIG. 1, this is a view in the direction of the z-axis.

The glazing 41 has a first channel-section glazing element 42 of annealed glass. The first channel-section glazing element 42 has a flange 42a and a web 42c.

The glazing 41 also has a second channel-section glazing element 44 of annealed glass. The second channel-section glazing element 44 also has a flange 44a and a web 44c. The flange 44a is taller than the flange 42a i.e. the flange 44a extends a greater distance from the respective web 44c than the flange 42a extends from the respective web 42c.

Located between the web 42c and the web 44c is an inner glazing element 46. In this example the inner glazing element 46 is a sheet of thermally toughened glass having substantially the same length as that of the channel-section glazing elements 42, 44. The width of the inner glazing element is slightly less than the distance between the inner surface of the flange 44a and the outer surface of the flange 42a. The thickness of the inner glazing element 46 is about 8 mm.

In an alternative example, the inner glazing element 46 is a laminated sheet comprising two sheets of annealed glass laminated together with a sheet of interlayer material such as PVB.

With respect to the orientation of the glazing 41 as shown in FIG. 6, there is an upper space 47 between the web 44c and the inner glazing element 46 and a lower space 48 between the inner glazing element 46 and the web 42c.

As in the example shown in FIG. 4, the glazing 41 has two airspaces between the webs 42c, 44c that help improve noise insulation. The glazing 41 also has improved thermal insulation properties (compared to the same arrangement without the inner glazing element 46). Thermal insulation can be improved with the provision of suitable coatings on the webs 42c, 44c and/or inner glazing element 46.

FIG. 7 shows a cross-sectional view of three glazings of the type shown in FIG. 4. With reference to FIG. 1, this is a view in the direction of the z-axis.

The three glazings 21 are arranged one beside the other in a vertical arrangement (as shown in FIG. 3) forming part of a facade 29 for a building. When arranged this way, the facade is considered to be a triple glazed facade.

Sealant 23 is provided between the longitudinal edges of adjacent glazing units 21 on one face of the facade and sealant 23' is provided between the longitudinal edges of adjacent glazing units 21 on other face of the facade. The sealant 23, 23' may be the same.

FIG. 8 shows a cross-sectional view of another facade 39 comprising two glazings of the type shown in FIG. 6 and one of the type shown in FIG. 4. With reference to FIG. 1, this is a view in the direction of the z-axis.

The two glazings 21 and glazing 41 are arranged one beside the other in a vertical arrangement (as shown in FIG. 3) forming part of a facade 39 for a building. The glazing 21 may be replaced with the glazing 31 of FIG. 5. As shown in FIG. 7, sealant may be provided between the longitudinal edges of adjacent glazings.

Figure 9:
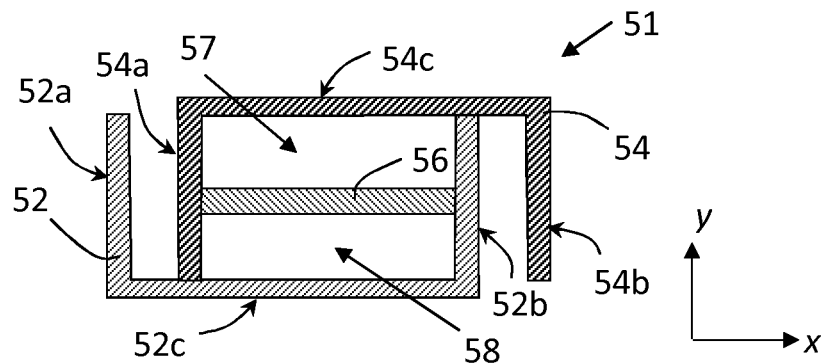
FIG. 9 is a cross-sectional view of another glazing according to the first aspect of the present invention.

FIG. 9 shows a cross-sectional view of another glazing 51 in accordance with the first aspect of the present invention. With reference to FIG. 2, this is a view in the direction of the z-axis.

The glazing 51 has a first channel-section glazing element 52 having a first flange 52a, a second flange 52b and a web 52c. The flanges 52a, 52b are continuous with the web 52c and the first channel-section glazing element has been bent from an initially flat sheet or ribbon of glass, for example as described in DE1496047A1.

The glazing 51 also has a second channel-section glazing element 54 having a first flange 54a, a second flange 54b and a web 54c. The first channel-section glazing element 52 has the same dimensions as the second channel-section glazing element 54. This is advantageous because both the first and second channel-section glazing elements can be made during the same production run.

The first and second channel-section glazing elements are arranged such that the flange 54a faces the web 52c, and the flange 54a is between the flanges 52a, 52b. The outer surface of the flange 54a is spaced from the inner surface of the flange 52a by a sufficient amount such that a flange of another glazing may be located therebetween (as will be described with reference to FIG. 10).

As a consequence of the first and second channel-section glazing elements having the same dimensions and because the flange 52a is spaced from the flange 54a, the flange 52b is spaced from the flange 54b. The space between the outer surface of flange 52b and the inner surface of flange 54b is sufficient that a flange of an adjacent glazing may be located therebetween.

The inner surfaces of the flanges 54a, 52b and portions of the inner surfaces of the webs 52c, 54c define a cavity in which is located an inner glazing element 56. The inner glazing element is located between the web 52c and web 54c. There is an upper space 57 between the web 54c and the inner glazing element 56. There is a lower space 58 between the inner glazing element 56 and the web 52c.

The inner glazing element 56 is located between the second flange 52b of the first channel-section glazing element 52 and the first flange 54a of the second channel-section glazing element 54. As a result, the inner glazing element 56 is adjacent the flange 54a and also adjacent the flange 52b. In relation to the orientation of the glazing shown in FIG. 9, the left hand edge of the inner glazing element 56 is adjacent to the flange 54a and the right hand edge of the inner glazing element 56 is adjacent the flange 52b. There may be a clip between the left hand edge of the inner glazing element 56 and the flange 54a. There may be a clip between the right hand edge of the inner glazing element 56 and the flange 52b. Suitable clips are described hereinafter, for example in relation to FIGS. 25 and 38.

In this example the inner glazing element is a thermally toughened flat glass sheet.

There may be a low emissivity coating or a solar control coating on the surface of the web 52c, 54c facing the inner glazing element 56.

There may be a low emissivity coating or a solar control coating on the surface of the web 52c, 54c facing away from the inner glazing element 56.

The low emissivity coating may comprise tin oxide.

The inner glazing element 56 has a first major surface facing web 54c and a second major surface facing web 52c. There may be a low emissivity coating on the first major surface of the inner glazing element 56. There may be a low emissivity coating on the second major surface of the inner glazing element 56. The provision of a low emissivity coating on a major surface of the inner glazing element improves the thermal insulation properties of the glazing 51.

There may be a solar control coating on the first major surface of the inner glazing element 56. There may be a solar control coating on the second major surface of the inner glazing element 56.

It is preferred for there to be a low emissivity coating on the first major surface of the inner glazing element 56 and a low emissivity coating on the surface of the web 54c facing the inner glazing element 56. In this case, the first channel-section glazing element faces the outside of a building i.e. towards the sun, when the glazing 51 is installed.

FIG. 10 shows a cross-sectional view of part of a facade 49 comprising a plurality of glazings 51. Each glazing 51 is positioned adjacent another glazing 51. To aid with the description of FIG. 10, three glazings 51, 51* and 51** are highlighted. Each glazing 51, 51* and 51* is the same as illustrated in FIG. 9, therefore each component part of glazing 51* and 51** will be referenced in the same way as for glazing 51 except with the addition of a "*" or "**" respectively after each component part. For example, glazing 51 has a first channel-section glazing element 52 having a first flange 52a. Glazing 51* therefore has a first channel-section glazing element 52* having a first flange 52a*, and so on. Likewise, glazing 51 has a first channel-section glazing element 52 having a first flange 52a**, and so on.

When installing the glazing to make facade 49, the second flange 54b* of glazing 51* fits into the space between the second flange 52a and the second flange 54a of glazing 51 such that the flange 52a faces the web 54c* of the second channel-section glazing element 54* of glazing 51*. Consequently, the flange 54b* of the second channel-section glazing element 54* of the glazing 51* faces the web 52c of the first channel-section glazing element 52 of the glazing 51.

As shown in FIG. 10, the second flange 54b of glazing 51 fits into the space between the second flange 52a* and the second flange 54a* of glazing 51* such that the flange 52a* faces the web 54c of the second channel-section glazing element 54 of glazing 51. Consequently, the flange 54b of the second channel-section glazing element 54 of the glazing 51 faces the web 52c* of the first channel-section glazing element 52* of the glazing 51*.

The glazings 51 forming the facade 49 may be vertically or horizontally orientated.

For each glazing 51 in the facade there may be suitable sealant material in between adjacent longitudinal edges.

As shown in the figure, the webs 52c of each first channel-section glazing element 52 of each respective glazing 51 form the outer surface of the facade i.e. that surface facing the outside of the building in which the facade is installed. The inner facing surface is formed by the webs 54c of the second channel-section glazing element 54 of each respective glazing 51.

Due to the inclusion of the inner glazing unit in each glazing 51, the facade has improved thermal performance. The thermal performance can be improved further by the inclusion of a low emissivity coating on the inner glazing elements and/or the first and/or second channel-section glazing elements as described with reference to FIG. 9.

Figure 11:
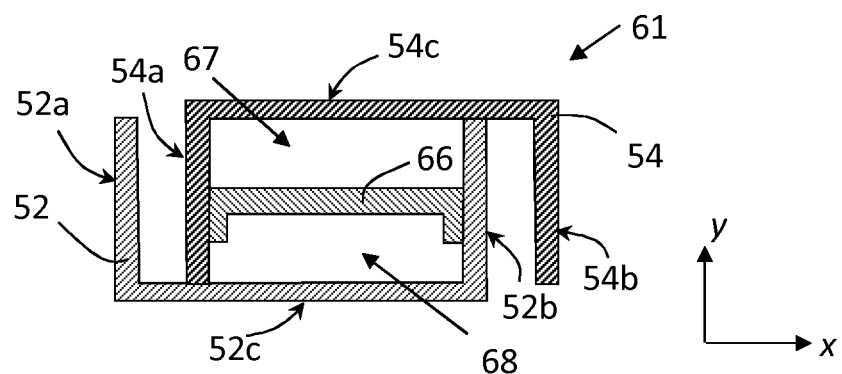
FIG. 11 is a cross-sectional view of another glazing according to the first aspect of the present invention.

FIG. 11 shows a cross-sectional view of another glazing 61 in accordance with the first aspect of the present invention. With reference to FIG. 2, this is a view in the direction of the z-axis.

The glazing 61 is essentially the same as the glazing 51 except the inner glazing element 66 is a channel-section glazing element instead of being a flat sheet of glazing material.

The inner glazing element 66 is a channel-section glazing element as defined with reference to FIG. 2. The dimensions of the inner glazing element are such that the channel-section glazing element 66 is able to fit in between the second flange 52b of the first channel-section glazing element 52 and the first flange 54a of the second channel-section glazing element 54. The flanges of the inner glazing element 66 are sized such that the inner glazing element 66 is able to fit between the webs 52c and 54c.

There may be a low emissivity coating on either major surface of the web of the inner glazing element 66. Preferably there is a low emissivity coating on the major surface of the web of the inner glazing element facing the web 52c of the first channel-section glazing element.

There may be a low emissivity coating or solar control coating on the surface of the web 54c facing the inner glazing element 66. There may be a low emissivity coating or solar control coating on the surface of the web 54c facing away from the inner glazing element 66.

Preferably there is a low emissivity coating on the major surface of the web of the inner glazing element facing the web 52c and a low emissivity coating on the surface of the web 54c facing the inner glazing element 66.

It is advantageous to use a channel-section glazing element as the inner glazing element instead of a flat sheet of glazing material because the flanges provide additional mechanical strength to the glazing 61. The size of the flanges may be varied to affect the mechanical strength of the glazing 61. For example, the flanges of the inner glazing element 66 may be between less than half the height of the flange 54a, 52b, preferably between 0.1 and 0.4 times the height of the flange 54a, 52b.

In certain applications when using the glazing 51 as shown in FIG. 9, the inner glazing element 56 has to be a thermally toughened glass sheet to improve mechanical strength of the glazing. In these same applications it has been found that by using the glazing 61 as shown in FIG. 11, because the inner glazing element 66 is a channel-section glazing element, the inner glazing element may be annealed glass instead of being thermally toughened.

The inner glazing element 66 is located between the second flange 52b of the first channel-section glazing element 52 and the first flange 54a of the second channel-section glazing element 54. As a result, the inner glazing element 66 is adjacent the flange 54a and also adjacent the flange 52b. In relation to the orientation of the glazing shown in FIG. 11, the left hand flange of the inner glazing element 66 is adjacent to the flange 54a and the right hand flange of the inner glazing element 56 is adjacent the flange 52b. There may be a clip between the left hand flange of the inner glazing element 6 and the flange 54a. There may be a clip between the right hand flange of the inner glazing element 66 and the flange 52b. Suitable clips are described hereinafter, for example in relation to FIGS. 25 and 38.

FIG. 12 shows a cross-sectional view of part of a facade 59 comprising a plurality of glazings 61 (labelled as 61, 61* and 61**, the component parts thereof being referred to in the same manner used with reference to FIG. 10). The facade 59 is constructed in a similar manner to the facade 49 shown in FIG. 10.

Figure 13:
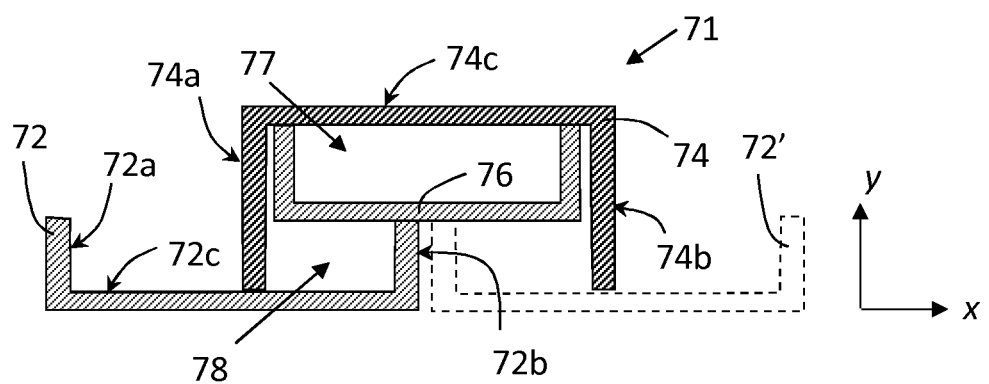
FIG. 13 is a cross-sectional view of another glazing according to the first aspect of the present invention.

FIG. 13 shows a cross-sectional view of another glazing 71 in accordance with the first aspect of the present invention. With reference to FIG. 1, this is a view in the direction of the z-axis.

The glazing 71 has a first channel-section glazing element 72 having a first flange 72a, a second flange 72b and a web 72c. The flanges 72a, 72b are continuous with the web 72c and the first channel-section glazing element has been bent from an initially flat sheet or ribbon of glass.

The glazing 71 also has a second channel-section glazing element 74 having a first flange 74a, a second flange 74b and a web 74c.

The flanges 72a, 72b of the first channel-section glazing element do not extend the same distance from the web 72c as the flanges 74a, 74b extend from the web 74c i.e. the flanges 72a, 72b are not as tall as the flanges 74a, 74b.

There may be a coating on the inner and/or outer surfaces of the web 72c and/or 74c. In particular, the coating may be a low emissivity coating or a solar control coating.

In a similar manner to the glazing 51 shown in FIG. 9, the first and second channel-section glazing elements 72, 74 are arranged such that the flange 74a faces the web 72c, and the flange 74a is between the flanges 72a, 72b. The outer surface of the flange 74a is spaced from the inner surface of the flange 52a by a sufficient amount such that a flange of another glazing may be located therebetween (as will be described with reference to FIG. 14). In contrast with the glazing 51, the flange 74a faces the web 72c closer to the midpoint of the web 72c between the flanges 72a, 72b. Likewise, the flange 72b faces the web 74c closer to the midpoint between the flanges 74a and 74b.

A third channel-section glazing element 72' is shown in phantom to indicate the position of the flange 74b with respect to an adjacent glazing.

The glazing 71 has an inner glazing element 76 in the form of a channel section glazing element 76. The inner glazing element has two lateral flanges and a web, and is of the type as described with reference to FIG. 2. The inner glazing element 76 is configured to fit within the space between the flanges 74a, 74b of the second channel-section glazing element 74. The flanges of the inner glazing element face the web 74c of the second channel-section glazing element. The flange 72b faces the web of the inner glazing element 76. The flanges of the inner glazing element 76 are sized such that the inner glazing element is able to fit into the space between the upper edge of flange 72b and inner facing surface of the web 74c.

There is an upper space 77 between the inner glazing element 76 and the web 74c, and a lower space 78 between a portion of the web 72c and a portion of the inner glazing element 76.

Figure 14:
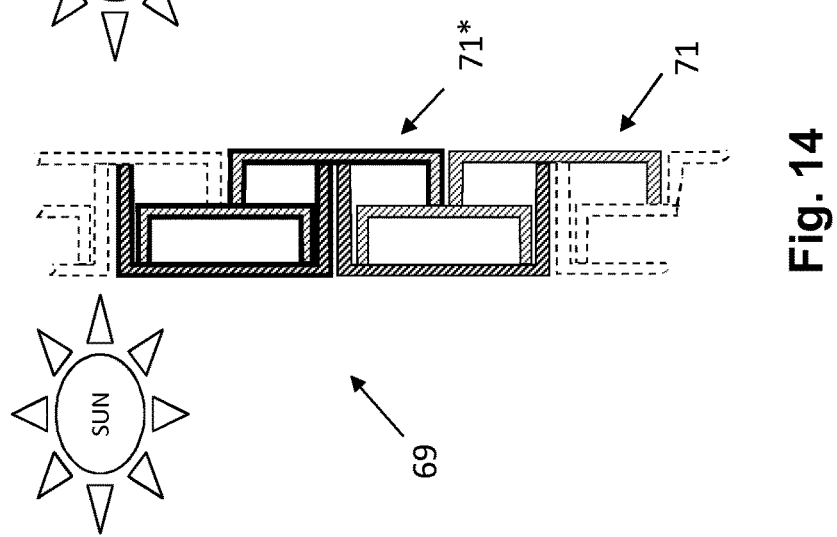
FIG. 14 is a cross-sectional view of a facade comprising two glazings of the type shown in FIG. 13.
Figure 17:
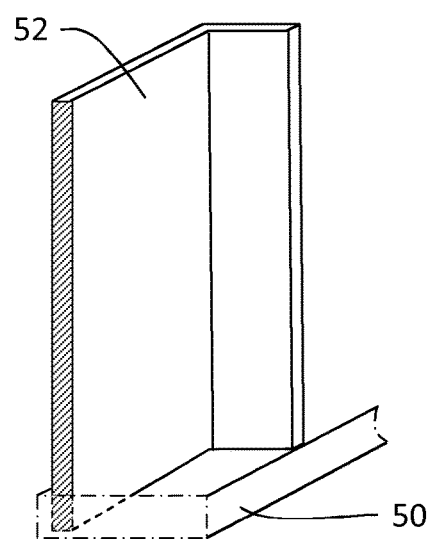
FIG. 17 is an isometric view of part of the facade shown in FIGS. 10 and 15 in a part assembled state.
Figure 18:
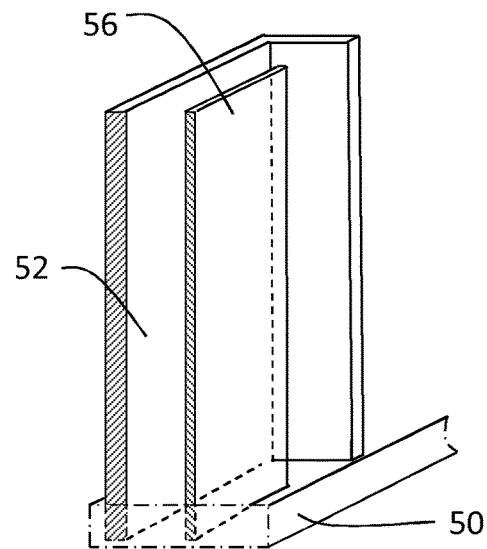
FIG. 18 is an isometric view of part of the facade shown in FIGS. 10 and 15 in a part assembled state.
Figure 19:
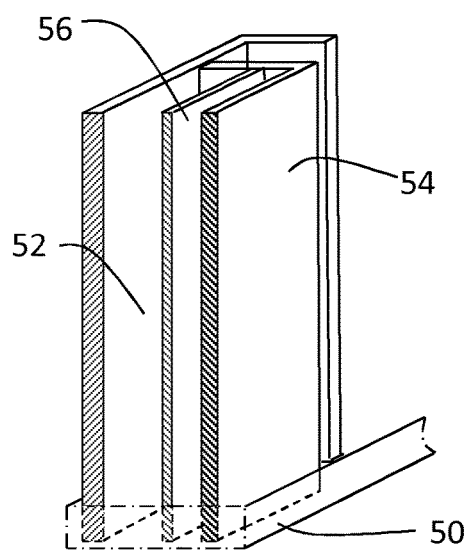
FIG. 19 is an isometric view of part of the facade shown in FIGS. 10 and 15 in a part assembled state.
Figure 20:
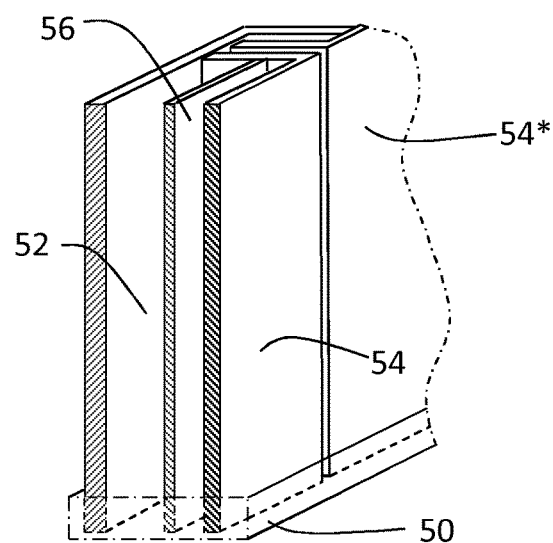
FIG. 20 is an isometric view of part of the facade shown in FIGS. 10 and 15 in an assembled state.

FIG. 14 shows part of a facade 69 comprising a plurality of glazing 71 of the type shown in FIG. 13. Two glazings 71 and 71* are specifically shown to illustrate how adjacent glazings are arranged in the facade.

Figure 15:
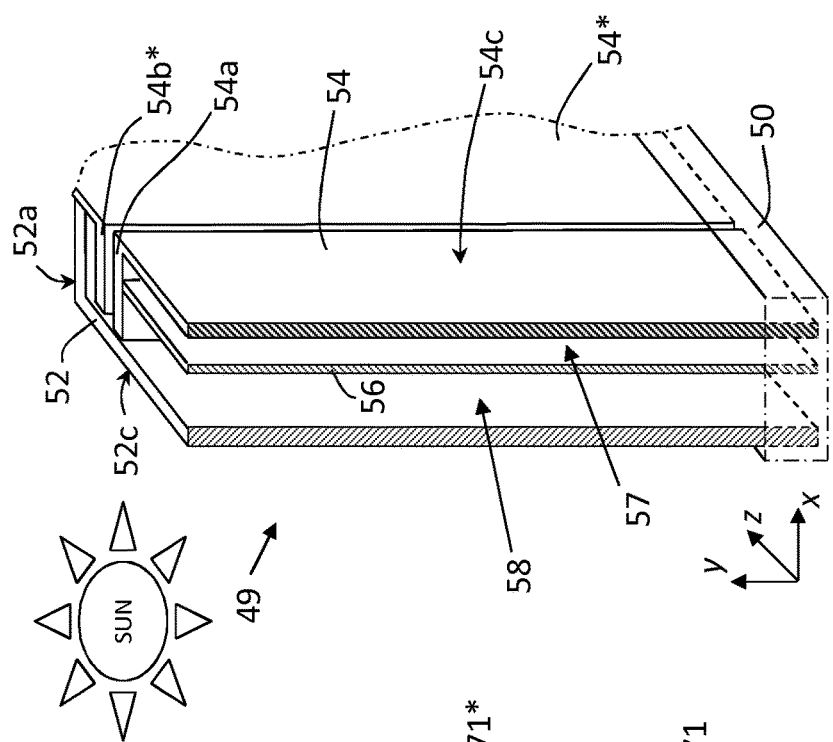
FIG. 15 is an isometric view of part of the facade shown in FIG. 10.

FIG. 15 shows a cross-sectional isometric view of part of the facade shown in FIG. 10. With reference to FIGS. 9 and 10, the part of the facade 49 shown in FIG. 15 has a first channel-section glazing element 52, a second channel-section glazing element 54 and an inner glazing element 56. Each glazing element 52, 54, 56 is orientated vertically with the lower ends located in a suitably configured lower frame 50. A similar upper frame 50' (not shown in FIG. 15 for clarity) is located at the upper ends of the glazing elements 52, 54, 56. The second channel-section glazing element 54\* of an adjacent glazing 51\* is shown. There is usually a sealant between adjacent longitudinal edges to prevent water ingress into the facade.

Usually the edges, in particular the longitudinally extending edges, of the channel-section glazing elements and/or the edges, in particular the longitudinally extending edges, of the inner glazing element are covered with a plastic cap or the like i.e. a clip, to prevent direct contact of the edges of the glazing elements with the webs or flanges.

The first channel-section glazing element 52 is not coated. There is not a low emissivity coating on either side of the web 52c of the first channel-section glazing element 52.

There is a low emissivity coating on the major surface of the inner glazing element 56 facing the web 54c.

There is a low emissivity coating on the major surface of the web 54c facing the inner glazing element 56.

Figure 16:
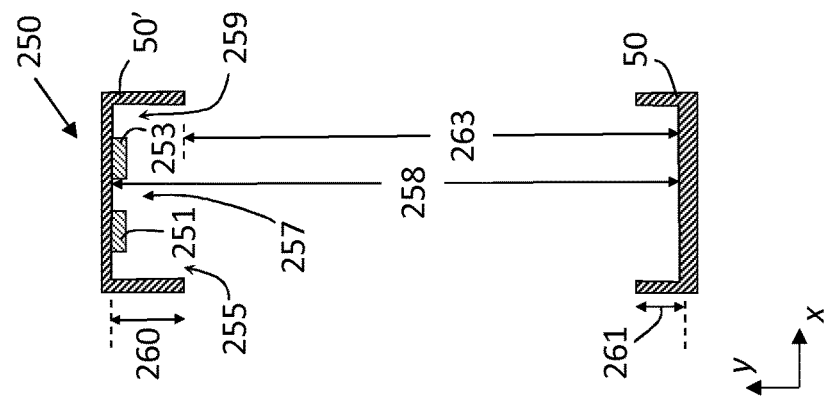
FIG. 16 shows a cross sectional view in a plane xy of FIG. 15 of a mounting frame used in constructing a facade.

FIG. 16 shows a cross sectional view in a plane xy of FIG. 15 i.e. in the direction z of a mounting frame 250 comprising a lower frame 50 and an upper frame 50'. Each frame 50, 50' is channel-like and made of suitable materials i.e. aluminium. The height of the walls (indicated by arrow 260) of the channel of the upper frame 50' are taller than the height of the walls (indicated by arrow 261) of the channel of the lower frame 50. The height of the walls 260 may about 4 cm. The height of the walls 261 may be about 2 cm.

The lower frame 50 and upper frame 50' are spaced apart such that the channel-section glazing elements and the inner glazing element may fit into the mounting frame 250. The spacing 258 is greater than the length of the channel-section glazing elements. Typically the spacing 258 is greater than the length of the channel-section glazing elements by the difference in the wall heights of the upper and lower frames i.e. by the distance 260-261. The distance 263 between the base of the lower frame 50 and the edge of the wall of the channel of the upper frame 50' must be less than the length of the channel-section glazing element so that the channel-section glazing element is able to be retained in the mounting frame. For example, for a channel-section glazing element having a length L, the spacing 258 is (L+height of wall 260–height of wall 261). When height of wall 260 is 4 cm and height of wall 261 is 2 cm, the spacing 258 is L+2 cm and the distance 263 is L−2 cm.

Located in the channel of the upper frame 50' are two plastic members 251 and 253. The plastic member 251 and part of the upper frame 50' define a slot 255 into which the web of the first channel-section glazing element may be located. The two plastic members are spaced apart to define a slot into which the inner glazing element may be located. The plastic member 253 and part of the upper frame 50' define a slot 259 into which the web of the second channel-section glazing element may be located. There may be similar plastic members located in the channel of the lower frame 50. Alternatively the plastic members may be integrally moulded with the frame 50'.

FIGS. 17-20 are schematic isometric representations showing how the part of the facade 49 shown in FIGS. 10 and 15 is constructed. The facade is mounted in a mounting frame of the type described with reference to FIG. 16. For clarity, only the lower frame 50 is shown in the FIGS. 17-20.

First the lower and upper frames 50, 50' are fixed to an appropriate aperture in the building where the facade is to be installed.

Next the first channel-section glazing element 52 is positioned into the mounting frame 150, lifted vertically towards the top of the upper frame 50' and then lowered into the lower frame 50, such that the lower ends of the channel-section glazing element 52 engage with suitably configured slots in the frame 50.

Next the inner glazing element 56 is positioned into the mounting frame 150, lifted vertically towards the top of the upper frame 50' and then lowered into a suitably configured slot in the lower frame 50 such that the inner glazing element is vertically orientated. It may be necessary to slide the inner glazing element 56 towards the flange of the first channel-section glazing element.

Next the second channel section glazing element 54 is positioned into the mounting frame 150, lifted vertically towards the top of the upper frame 50' and then lowered into a suitably configured slot in the lower frame 50 such that the flange of the second channel-section glazing element faces the web of the first channel-section glazing element. At this point, a glazing 51 has been formed.

Plastic members in the lower and upper frames ensure the first and second channel-section glazing elements and the inner glazing element are fixed in position.

Usually the edges, in particular the longitudinally extending edges, of the channel-section glazing elements and/or the edges, in particular the longitudinally extending edges, of the inner glazing element are covered with a plastic cap or the like i.e. a clip, to prevent direct contact of the edges with the webs or flanges.

The facade is further constructed by placing another channel-section glazing element 54\* into the mounting frame as described above.

Further glazing elements may be added to the mounting frame to build up the desired facade, as illustrated in FIG. 10.

The space between adjacent flanges is filled with a suitable sealant, which may extend the whole length of the space. Usually the same sealant is used on the front and rear of the facade.

Figure 21:
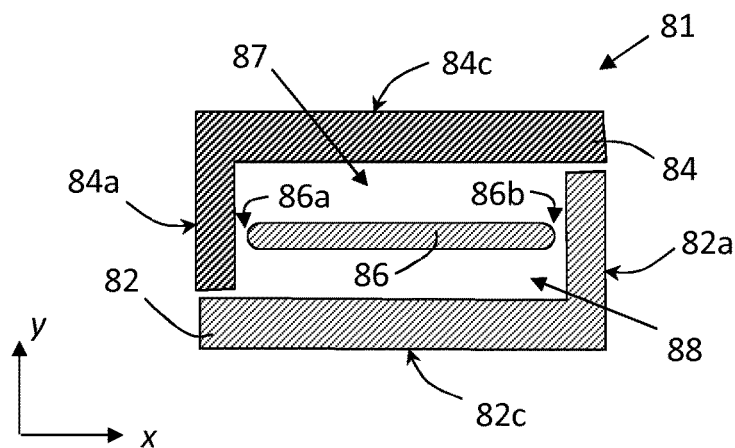
FIGS. 21 to 23 show cross-sectional views of other glazings according to the present invention.

FIG. 21 shows a cross-sectional view of a glazing 81 in accordance with the present invention. With reference to FIG. 1, this is a view in the direction of the z-axis.

The glazing 81 has a first channel-section glazing element 82 of annealed glass. The first channel-section glazing element 82 has a flange 82a and a web 82c. The flange 82a is continuous with the web 82c and the first channel-section glazing element has been bent from an initially flat sheet or ribbon of glass, for example as described in DE1496047A1.

The flange 82a is substantially perpendicular to the web 82c. The web 82c has a thickness of 7 mm. The flange 82a has a thickness of 7 mm.

The glazing 81 also has a second channel-section glazing element 84 of annealed glass. The second channel-section glazing element 84 has a flange 84a and a web 84c. The flange 84a is continuous with the web 84c and the first channel-section glazing element has been bent from an initially flat sheet or ribbon of glass, for example as described in DE1496047A1.

The flange 84a is substantially perpendicular to the web 84c. The web 84c has a thickness of 7 mm. The flange 84a has a thickness of 7 mm.

The second channel-section glazing element has substantially the same dimensions as the first channel-section glazing element.

Both channel-section glazing elements 82, 84 are made of soda-lime-silica glass.

The first and second channel-section glazing elements are arranged such that the flange 82a of the first channel-section glazing element faces 82 faces the second channel-section glazing element 84, and the flange 84a of the second channel-section glazing element 84 faces the first channel-section glazing element 82. In this arrangement the inner facing surfaces of the channel-section glazing elements 82, 84 define a cavity.

There may be a low emissivity coating on a surface of the web 82c and/or 84c facing into the cavity.

In accordance with the present invention a sheet of glass 86 having two fire-polished edges 86a, 86b is located in the cavity defined by the inner facing surfaces of the channel-section glazing elements 82, 84.

The sheet of glass 86 is flat and is a sheet of rolled soda-lime-silica glass having been formed between a pair of spaced apart rollers. The fire polished edges 86a, 86b have not been mechanically treated and are as-formed by the rolling process.

The separation of the fire-polished edges along the length of the glass sheet is substantially constant. That is, the fire-polished edges 86a, 86b are substantially parallel. The fire-polished edges are substantially straight.

Figure 22:
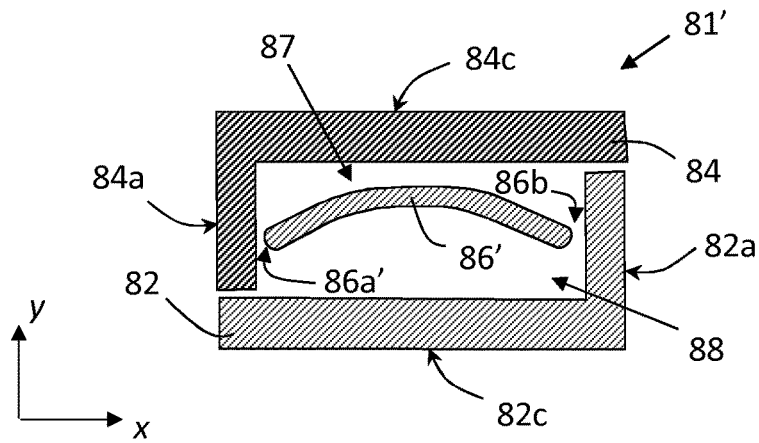

The sheet of glass 86 may have a cylindrical curvature about one or two axes. For example the sheet of glass may be curved along the length and/or width thereof. A cross sectional view of a glazing 81' having a curved sheet of glass 86' with fire-polished edges 86a', 86b' for the inner glazing element is shown in FIG. 22. The glazing 81' is essentially the same as the glazing 81 of FIG. 21 except for the curved sheet of glass 86' replacing the flat sheet of glass 86.

The major surfaces of the flat glass sheet may have a pattern thereon introduced by the rollers or after the forming process.

The flat glass sheet 86 is a soda-lime-silica glass sheet having a typical composition (in weight percent) of $SiO_2$ 72.5, $Na_2O$ 13.5, $Al_2O_3$ 1.0, $K_2O$ 0.5, CaO 8.4, MgO 3.9 and $SO_3$ 0.2. The flat glass sheet may be tinted by the addition of suitable colourants to the glass composition such as iron oxide ($Fe_2O_3$) and/or nickel oxide (NiO) and/or cobalt oxide ($Co_3O_4$) and/or selenium (Se). The level of the particular colourants is chosen to achieve desired optical properties for the flat glass sheet, such as transmitted colour, visible light transmission, solar heat transmission etc.

The flat glass sheet 86 has a length the same as that of the channel-section glazing elements 82, 84. The width of the flat glass sheet is slightly less than the distance between the inner surfaces of the flanges 82a, 84a. The thickness of the flat glass sheet 86 is about 8 mm.

Typically the glass sheet 86 has a length of 7 m and a width of 35 cm.

It was found not necessary to thermally toughen the flat glass sheet 86 because the fire-polished edges have been found to improve the bending strength of the glass sheet. If desired the flat glass sheet may be thermally toughened or chemically toughened.

With respect to the orientation of the glazing 81 as shown in FIG. 21, there is an upper space 87 between the web 84c and the glass sheet 86 and a lower space 88 between the glass sheet 86 and the web 82c.

The glass sheet 86 divides the cavity defined by the inner facing surfaces of the channel-section glazing elements 82, 84 into two airspaces. This improves noise insulation. The glazing 81 also has improved thermal insulation properties (compared to the same arrangement without the flat glass sheet 86).

The upper airspace 87 is 16 mm (distance from glass sheet 86 to inner facing surface of web 84c) and the lower airspace 88 is 16 mm (distance from glass sheet 86 to inner facing surface of web 82c).

On the major surface of the glass sheet 86 that faces the web 82c there may be a low emissivity coating thereon.

On the major surface of the glass sheet 86 that faces the web 84c there may be a low emissivity coating thereon.

There may be a low emissivity coating on the major surface of the glass sheet 86 that faces the web 84c and a solar control coating on the major surface of the glass sheet 86 that faces the web 82c. Alternatively there may be a solar control coating on the major surface of the glass sheet 86 that faces the web 84c and a low emissivity coating on the major surface of the glass sheet 86 that faces the web 82c.

It will be readily apparent to one skilled in the art that the glazing 81 is essentially the same configuration as the glazing 21 shown in FIG. 4.

Figure 23:
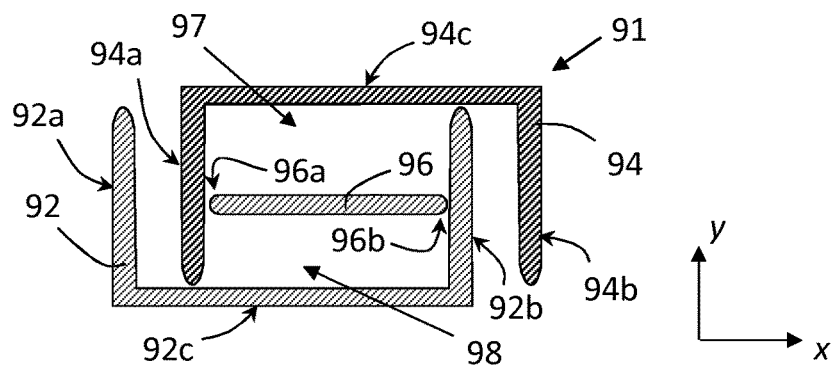

FIG. 23 shows a cross-sectional view of another glazing 91 in accordance with the present invention. With reference to FIG. 2, this is a view in the direction of the z-axis.

The glazing 91 has a first channel-section glazing element 92 having a first flange 92a, a second flange 92b and a web 92c. The flanges 92a, 92b are continuous with the web 92c and the first channel-section glazing element has been bent from an initially flat sheet or ribbon of glass, for example as described in DE1496047A1.

The glazing 91 also has a second channel-section glazing element 94 having a first flange 94a, a second flange 94b and a web 94c. The first channel-section glazing element 92 has the same dimensions as the second channel-section glazing element 94. This is advantageous because both the first and second channel-section glazing elements can be made during the same production run.

The first and second channel-section glazing elements 92, 94 are arranged such that the flange 94a faces the web 92c, and the flange 94a is between the flanges 92a, 92b. The outer surface of the flange 94a is spaced from the inner surface of the flange 92a by a sufficient amount such that a flange of another glazing may be located therebetween (as will be described with reference to FIG. 24).

As a consequence of the first and second channel-section glazing elements having the same dimensions and because the flange 92a is spaced from the flange 94a, the flange 92b is spaced from the flange 94b. The space between the outer surface of flange 92b and the inner surface of flange 94b is sufficient that a flange of an adjacent glazing may be located therebetween.

The inner surfaces of the flanges 94a, 92b and portions of the inner surfaces of the webs 92c, 94c define a cavity in which is located a glass sheet 96 having fire-polished edges 96a, 96b. The glass sheet 96 is located between the web 92c and web 94c. There is an upper space 97 between the web 94c and the glass sheet (which is an inner glazing element) 96. There is a lower space 98 between the glass sheet 96 and the web 92c. The airspaces 97, 98 may be 16 mm (distance from glass sheet 96 to web 92c or web 94c).

A curved sheet of glass may be used in place of flat glass sheet 96, for example of the type shown in FIG. 22 (curved glass sheet 86').

There may be a low emissivity coating or a solar control coating on the surface of the web 92c, 94c facing the glass sheet 96.

There may be a low emissivity coating or a solar control coating on the surface of the web 92c, 94c facing away from the glass sheet 96.

The low emissivity coating may comprise tin oxide.

The glass sheet 96 has a first major surface facing web 94c and a second major surface facing web 92c. There may be a low emissivity coating on the first major surface of the glass sheet 96. There may be a low emissivity coating on the second major surface of the glass sheet 96. The provision of a low emissivity coating on a major surface of the inner glass sheet 96 improves the thermal insulation properties of the glazing 91.

There may be a solar control coating on the first major surface of the glass sheet 96. There may be a solar control coating on the second major surface of the glass sheet 96.

It is preferred for there to be a low emissivity coating on the first major surface of the glass sheet 96 and a low emissivity coating on the surface of the web 94c facing the glass sheet 96. In this case, the first channel-section glazing element 92 faces the outside of a building i.e. towards the sun, when the glazing 91 is installed.

It will be readily apparent to one skilled in the art that the glazing 91 is essentially the same configuration as the glazing 51 shown in FIG. 9.

The inner glazing element 96 is located between the flange 92b of the first channel-section glazing element 92 and the flange 94a of the second channel-section glazing element 94. As a result, the inner glazing element 96 is adjacent the flange 92b and also adjacent the flange 94a. In relation to the orientation of the glazing shown in FIG. 23, the left hand edge of the inner glazing element 96 is adjacent to the flange 94a and the right hand edge of the inner glazing element 96 is adjacent the flange 92b. There may be a clip between the left hand edge of the inner glazing element 96 (i,e, edge 96a) and the flange 94a. There may be a clip between the right hand edge of the inner glazing element 96 (i.e. edge 96b) and the flange 92b. Suitable clips are described hereinafter, for example in relation to FIG. 25.

FIG. 24 shows a cross-sectional view of part of a facade 89 comprising a plurality of glazings 91 of the type described with reference to FIG. 23. Each glazing 91 is positioned adjacent another glazing 91. To aid with the description of FIG. 24, three glazings 91, 91* and 91** are highlighted. Each glazing 91, 91* and 91* is the same as illustrated in FIG. 23, therefore each component part of glazing 91* and 91** will be referenced in the same way as for glazing 91 except with the addition of a "*" or "**" respectively after each component part (the component parts thereof being referred to in the same manner used with reference to FIG. 10).

When installing the glazing to make facade 89, the second flange 94b* of glazing 91* fits into the space between the second flange 92a and the second flange 94a of glazing 91 such that the flange 92a faces the web 94c* of the second channel-section glazing element 94* of glazing 91*. Consequently, the flange 94b* of the second channel-section glazing element 94* of the glazing 91* faces the web 92c of the first channel-section glazing element 92 of the glazing 91.

As shown in FIG. 24, the second flange 94b of glazing 91 fits into the space between the second flange 92a* and the second flange 94a* of glazing 91* such that the flange 92a* faces the web 94c of the second channel-section glazing element 94 of glazing 91. Consequently, the flange 94b of the second channel-section glazing element 94 of the glazing 91 faces the web 92c* of the first channel-section glazing element 92* of the glazing 91*.

The glazings 91 forming the facade 89 may be vertically or horizontally orientated.

For each glazing 91 in the facade there may be suitable sealant material in between adjacent longitudinal edges.

As shown in FIG. 24 and with reference to FIG. 23, the webs 92c of each first channel-section glazing element 92 of each respective glazing 91 form the outer surface of the facade i.e. that surface facing the outside of the building in which the facade is installed. The inner facing surface of the facade 89 is formed by the webs 94c of the second channel-section glazing element 94 of each respective glazing 91.

Due to the inclusion of the glass sheet 96 in each glazing 91, the facade 89 has improved thermal performance. The thermal performance can be improved further by the inclusion of a low emissivity coating on the glass sheets 96 of each glazing 91 and/or the first and/or second channel-section glazing elements as described with reference to FIG. 23.

FIG. 25 shows in more detail the glazing 91. The flat glass sheet 96 is positioned between two clips 90, 90'.

With reference to FIG. 26, the clip 90 has a PVC strip 90a having a flat surface 90b. The strip 90a is an elongate member. Opposite the flat surface 90b is a slot 90c formed from two PVC elements 90e and 90f. The elements 90e, 90f may be integrally moulded with the strip 90a or adhered thereto via adhesive. The fire-polished edge 96a of the flat glass sheet 96 fits into the slot 90c i.e. in the direction or arrow 90h. The clip 90' is essentially identical to the clip 90. Since the fire polished edge 96a is rounded it is able to fit into the slot 60c more easily than compared to an edge that has sharp corners.

The clips 90, 90' may be cut from a length of moulded PVC consisting of the strip 90a and elements 90e, 90f integrally moulded therewith.

The flat surface 90b is configured to be positioned adjacent to an inner facing surface of a flange of a channel-section glazing element.

It will be readily apparent to one skilled in the art that the clips 90, 90' may be used in the construction of the glazing shown in FIG. 9.

FIG. 27 shows a glazing 101 in accordance with the second aspect of the present invention. The glazing 101 comprises a first channel-section glazing element 102 and a second channel-section glazing element 104. Each channel section glazing element 102, 104 is of the type described with reference to FIG. 2.

The channel-section glazing element 102 has a web 102c with flanges 102a, 102b at lateral edges thereof.

The channel-section glazing element 104 has a web 104c with flanges 104a, 104b at lateral edges thereof.

The channel-section glazing elements 102, 104 have substantially the same dimensions.

The flange 102a faces the flange 104a and the flange 102b faces the flange 104b.

The inner faces surfaces of the channel-section glazing elements 102, 104 define a cavity. The cavity is split into two airspaces 107, 109 by a sheet of flat glass 106 located in the cavity. The sheet of flat glass 106 has two fire-polished edges 106a, 106b (see FIG. 28).

The flat glass sheet 106 is the same as described with reference to FIG. 21 and FIG. 23.

The flat glass sheet 106 is held in position by clips 110, 112. The clip 110 is configured to engage with the ends of the flanges 102a, 104a and the fire-polished edge 106a of the flat glass sheet 106. The clips 110, 112 maintain a spacing of the channel-section glazing elements 102, 104 such that there is a gap 103 between the ends of the flanges of each channel-section glazing element 102, 104. This is shown more clearly in FIG. 28 where for clarity the glazing 101 is shown without the clips in place.

Given that the two channel-section glazing elements 102, 104 are substantially the same, the flat glass sheet 106 is positioned equidistant between the webs 102c, 104c. As a consequence the two airspaces 107, 109 are the same volume.

With the first and second channel-section glazing elements arranged as shown in FIG. 27, it may be desirable to position the flat glass sheet at other positions in the cavity. This is shown in FIG. 29 and FIG. 30.

FIG. 29 shows another glazing 111 in accordance with the second aspect of the present invention. The glazing 111 comprises the same channel-section glazing elements 102, 104 and flat glass sheet 106 as described with reference to the glazing 101 of FIG. 27 except that different clips 120, 102 are used to position the glass sheet 106 at a different location in the cavity. The clips 120, 122 are used to locate the flat glass sheet 106 between the inner facing surfaces of the flanges 104a, 104b. The type of clip 120, 122 is similar to the clip 90 of FIG. 26.

If the clips 120, 122 are inverted the flat glass sheet 106 may be located between the inner facing surfaces of the flanges 102a, 102b.

FIG. 30 shows a glazing 111' which is the same as glazing 111 except that clips 120, 122 of glazing 111 have been replaced by clips 120' and 122'.

The clip 120' is configured with two slots into which the ends of flanges 102a, 104a may be received. The clip 122' is configured with two slots into which the ends of flanges 102b, 104b may be received.

The clips 110, 112 and 120', 122' shown in FIGS. 27 and 30 respectively may be modified such that male and female interlocking members are on adjacent clips. This is illustrated in FIGS. 31, 32 and 33.

Figure 31:
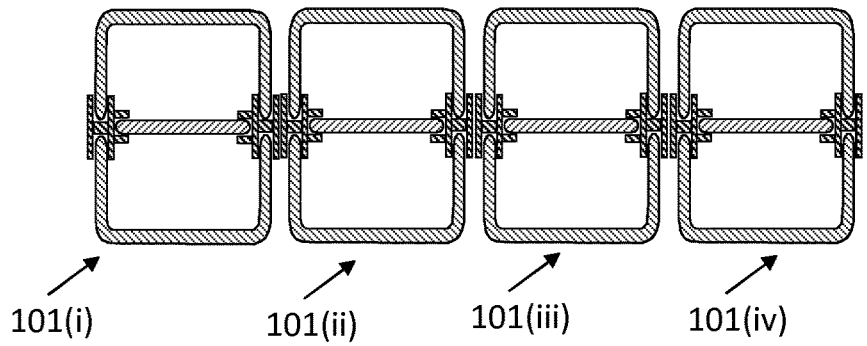
FIG. 31 is a cross-sectional view of a facade comprising four glazings of the type shown in FIG. 27.
Figure 32:
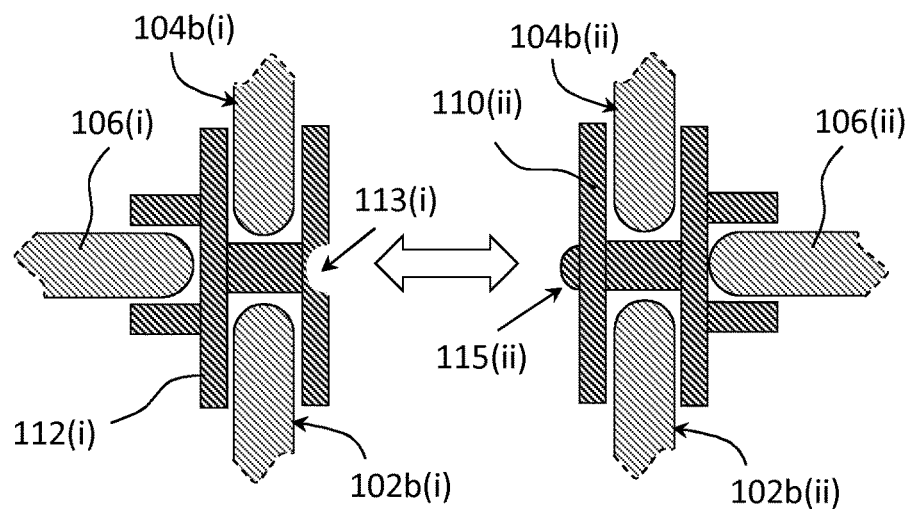
FIG. 32 is a cross-sectional view of a portion of the facade shown in FIG. 31 illustrating how two adjacent clips engage.

In FIG. 31 there are shown four glazings of the type shown in FIG. 27. The glazings are each referred to as 101(i), 101(ii), 101(iii) and 101(iv). The component parts in each glazing is designated by a (i), (ii), (iii) or (iv). For example, the flat glass sheet in glazing 101(ii) is referred to as 106(ii).

Glazing 101(i) is connected to glazing 101(ii) because the clip 112(i) of glazing 101(i) and the clip 110(ii) of glazing 101(ii) have been modified. In one embodiment shown in FIG. 32 the clip 112(i) has a groove 113(i) configured to engage with a projection 115(ii) on the side of clip 110(ii). The projection 115(ii) may be a snap fit with the groove 113(i) and releasably attachable thereto i.e. in the direction of the arrow.

Figure 33:
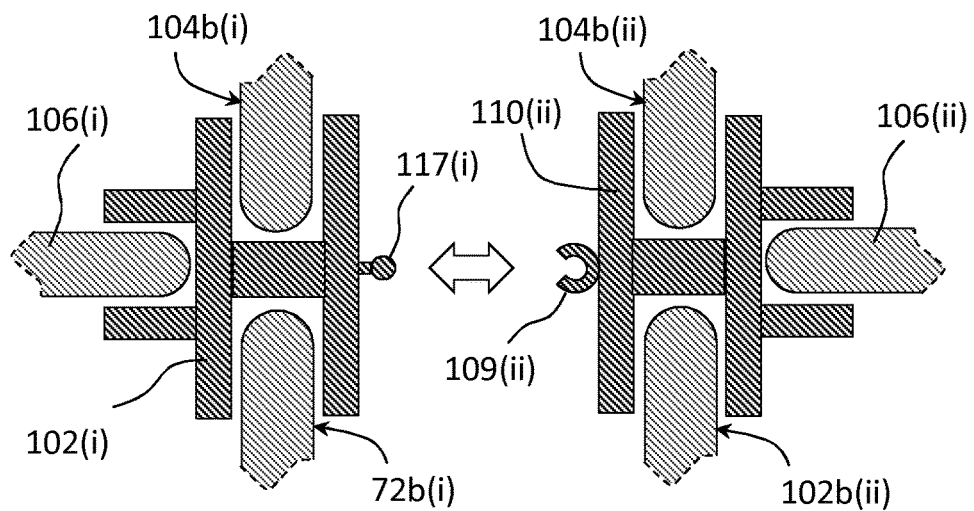
FIG. 33 is a cross-sectional view of a portion of the facade shown in FIG. 31 illustrating another way how two adjacent clips engage.

In another embodiment shown in FIG. 33 the clip 112(i) has a projecting element 117(i) configured to engage with a projecting groove 119(ii) on the side of clip 110(ii). The projecting element 117(i) fits into the projecting groove 119(ii) and is releasably attachable thereto i.e. in the direction of the arrow.

Other forms of male/female engaging parts for connecting the clips may be used.

The use of clips having male/female engaging parts of the type shown in FIGS. 32 and 33 is advantageous because each glazing 101 may be pre-assembled and a facade more quickly assembled by clipping together adjacent glazings.

The ends of the flanges and/or the ends of the flat glass sheet may be a snug fit in the respective slot of the respective clip.

Figure 34:
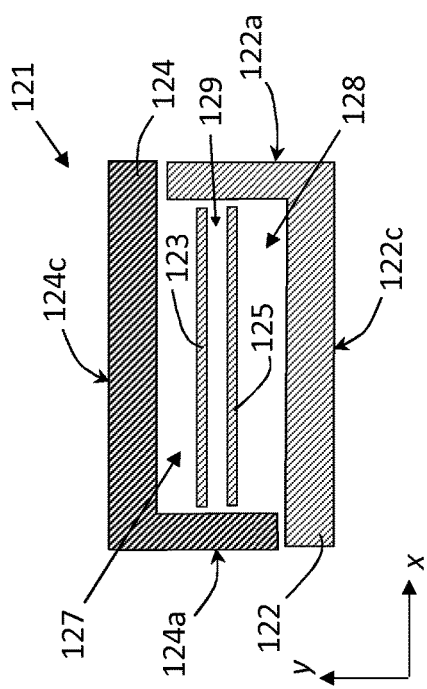

FIG. 34 shows a cross-sectional view of a glazing 121 in accordance with the present invention. With reference to FIG. 1, this is a view in the direction of the z-axis.

The glazing 121 is similar to the glazing 21 of FIG. 4 and the glazing 81 of FIG. 21, except there are two sheets of glass in the cavity.

The glazing 121 has a first channel-section glazing element 122 of annealed glass. The first channel-section glazing element 122 has a flange 122a and a web 122c. The flange 122a is continuous with the web 122c and the first channel-section glazing element has been bent from an initially flat sheet or ribbon of glass, for example as described in DE1496047A1.

The first channel-section glazing element 122 is of the type as described in relation to FIG. 1.

The flange 122a is substantially perpendicular to the web 122c. The web 122c has a thickness of 7 mm. The flange 122a has a thickness of 7 mm.

The glazing 121 also has a second channel-section glazing element 124 of annealed glass. The second channel-section glazing element 124 has a flange 124a and a web 124c. The flange 124a is continuous with the web 124c and the first channel-section glazing element has been bent from an initially flat sheet or ribbon of glass, for example as described in DE1496047A1.

The second channel-section glazing element 124 is of the type as described in relation to FIG. 1.

The flange 124a is substantially perpendicular to the web 124c. The web 124c has a thickness of 7 mm. The flange 124a has a thickness of 7 mm.

The second channel-section glazing element has substantially the same dimensions as the first channel-section glazing element.

Both channel-section glazing elements 122, 124 are made of soda-lime-silica glass.

The first and second channel-section glazing elements are arranged such that the flange 122a of the first channel-section glazing element faces 122 faces the second channel-section glazing element 124, and the flange 124a of the second channel-section glazing element 124 faces the first channel-section glazing element 122. In this arrangement the inner facing surfaces of the channel-section glazing elements 122, 124 define a cavity.

There may be a low emissivity coating on a surface of the web 122c and/or web 124c facing into the cavity.

In accordance with the present invention an inner glazing element comprising a first sheet of glass 123 and a second sheet of glass 125 are located in the cavity defined by the inner facing surfaces of the channel-section glazing elements 122, 124.

The sheets of glass 123, 125 are flat and each sheet may be cut from a large glass sheet that has been produced by a float process. As such the edges of the glass sheets are cut edges that may have been edge worked.

In the embodiment shown in FIG. 34, the glass sheets 123, 125 are each soda-lime-silica glass sheets having a typical composition (in weight percent) of $SiO_2$ 72.5, $Na_2O$ 13.5, $Al_2O_3$ 1.0, $K_2O$ 0.5, CaO 8.4, MgO 3.9 and $SO_3$ 0.2.

The sheets of glass 123, 125 have a length the same as that of the channel-section glazing elements 122, 124. The width of each of the sheets of glass 123, 125 is slightly less than the distance between the inner surfaces of the flanges 122a, 124a. The thickness of the sheets of glass 123, 125 is about 8 mm.

With respect to the orientation of the glazing 121 as shown in FIG. 34, there is a first space 129 between the sheet of glass 123 and the sheet of glass 125. There is an upper (second) space 127 between the web 124c and the sheet of glass sheet 123 and a lower (third) space 128 between the sheet of glass 125 and the web 122c.

The sheets of glass 123, 125 divide the cavity defined by the inner facing surfaces of the channel-section glazing elements 122, 124 into three spaces. This improves noise insulation. The glazing 121 also has improved thermal insulation properties (compared to the same arrangement without the inner glazing element i.e. without the glass sheets 123, 125).

The size of the upper space 127, lower space 128 and first space 129 may be the same or different.

In this example the upper space 127 is 10 mm (distance from glass sheet 123 to inner facing surface of web 124c) and the lower space 128 is 10 mm (distance from glass sheet 125 to inner facing surface of web 122c). The separation of the first sheet of glass 123 and the second sheet of glass 125 is about 10 mm.

Typically the spaces 127, 128 and 129 are airspaces.

One or both major surfaces of the sheet of glass 123 and/or glass sheet 125 may have a pattern thereon.

On one or both the major surfaces of the glass sheet 123 and/or glass sheet 125 there may be a low emissivity coating thereon.

On one or both the major surfaces of the sheet of glass 125 there may be a solar control coating thereon.

There may be a low emissivity coating on the major surface of the sheet of glass 123 that faces the web 124c and a solar control coating on the major surface of the sheet of glass 125 that faces the web 122c.

In an alternative embodiment to that shown in FIG. 34, one or both sheets of glass 123, 125 may be a sheet of rolled soda-lime-silica glass having been formed as a sheet between a pair of spaced rollers. In this alternative embodiment the rolled glass sheet or sheets of soda-lime-silica glass may have one or more fire polished edges that have not been mechanically treated and is/are as-formed by the rolling process. It is preferred that the fire-polished edges face the flange portions of the channel-section glazing elements.

In another alternative embodiment to that shown in FIG. 34, one or both sheets of glass 123, 125 may have a cylindrical curvature about one or two axes. For example the sheet of glass 123 and/or sheet of glass 125 may be curved along the length and/or width thereof. The concave surface of the or each curved glass sheet 123, 125 may face the web 122c or the web 124c.

Figure 35:
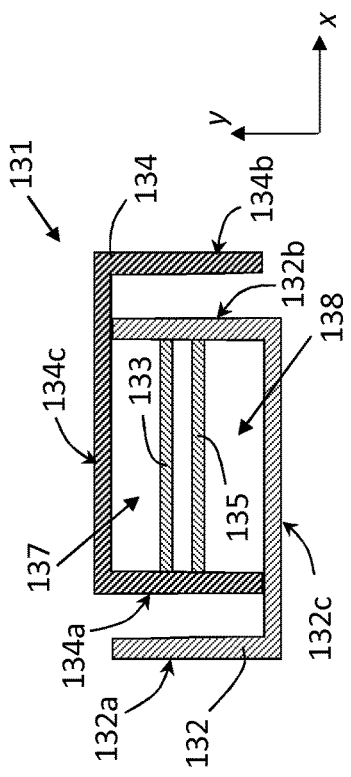
FIGS. 34 and 35 show cross-sectional views of other glazings according to the present invention.

FIG. 35 shows a cross-sectional view of another glazing 131 in accordance with the present invention. With reference to FIG. 2, this is a view in the direction of the z-axis. The glazing 131 is similar to the glazing 51 of FIG. 9 and the glazing 91 of FIG. 23, except there are two sheets of glass in the cavity.

The glazing 131 has a first channel-section glazing element 132 having a first flange 132a, a second flange 132b and a web 132c. The flanges 132a, 132b are continuous with the web 32c and the first channel-section glazing element has been bent from an initially flat sheet or ribbon of glass, for example as described in DE1496047A1.

The glazing 131 also has a second channel-section glazing element 134 having a first flange 134a, a second flange 134b and a web 134c. The first channel-section glazing element 132 has the same dimensions as the second channel-section glazing element 134. This is advantageous because both the first and second channel-section glazing elements can be made during the same production run.

The first channel-section glazing element 132 and second channel-section glazing element 134 are each of the type as described in relation to FIG. 2.

The first and second channel-section glazing elements 132, 134 are arranged such that the flange 134a faces the web 132c, and the flange 134a is received in the space between the flanges 132a, 132b. The outer surface of the flange 134a is spaced from the inner surface of the flange 132a by a sufficient amount such that a flange of another glazing may be located therebetween (as will be described with reference to FIG. 37).

As a consequence of the first and second channel-section glazing elements having the same dimensions and because the flange 132a is spaced from the flange 134a, the flange 132b is spaced from the flange 134b. The space between the outer surface of flange 132b and the inner surface of flange 134b is sufficient that a flange of an adjacent glazing may be located therebetween.

The inner surfaces of the flanges 134a, 132b and portions of the inner surfaces of the webs 132c, 134c define a cavity in which is located a first sheet of glass 133 and a second sheet of glass 135. The first and second sheets of glass 133, 135 are located between the web 132c and web 134c. There is an upper space 137 between the web 134c and the first sheet of glass 133. There is a lower space 138 between the second sheet of glass sheet 135 and the web 132c.

With the first and second channel-section glazing elements arranged as shown in FIG. 35, the sheets of glass 133, 135 are sized such that the lateral edges thereof fit in between the inner facing surface of flange 134a and the inner facing surface of the flange 132b.

The first sheet of glass 133 is spaced apart from the second sheet of glass 135 by a space 139. This is shown more clearly in FIG. 36 which shows a close up view of a portion of the glazing 131.

There may be a low emissivity coating or a solar control coating on the surface of the web 132c, 134c facing the glass sheet 133, 135.

There may be a low emissivity coating or a solar control coating on the surface of the web 132c, 134c facing away from the glass sheet 133, 135.

The low emissivity coating may comprise tin oxide.

There may be a solar control coating on one or both major surfaces of the glass sheet 133 and/or 135. It is preferred for there to be a low emissivity coating on one or both major surfaces of the glass sheet 133 and a low emissivity coating on one or both major surfaces of the glass sheet 135.

The may be a solar control coating on the web 132c and/or web 134c. There may be a solar control coating on the web 132c and/or web 134c. The may be a solar control coating on the web 132c and a solar control coating on the web 134c.

In an alternative to the embodiment shown in FIG. 35, the second sheet of glass 135 is replaced with a sheet of polycarbonate.

In another alternative to the embodiment shown in FIG. 35, one or both sheets of glass 133, 135 is replaced by a laminated glazing each comprising at least one sheet of glazing material and an interlayer structure laminated thereto.

Figure 36:
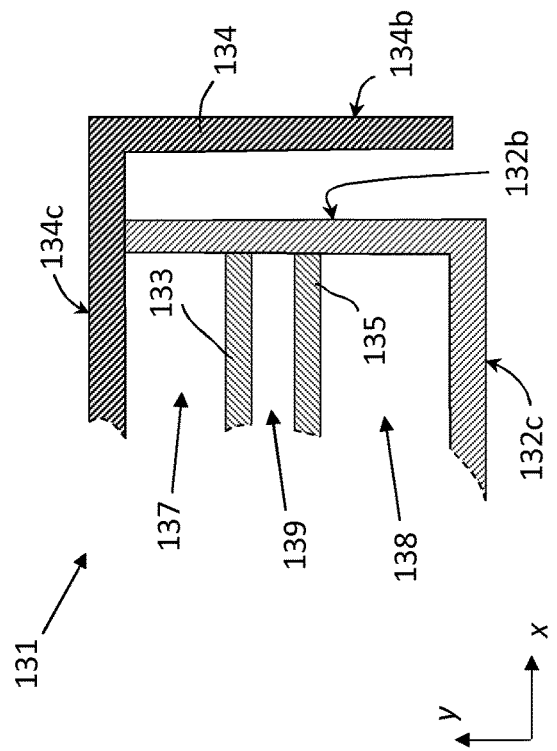
FIG. 36 is a an enlarged view of a portion of the glazing shown in FIG. 35.

FIG. 36 shows a close up view of a portion of the glazing 131 to better illustrate the space 139 between the first sheet of glass 133 and the second sheet of glass 135.

FIG. 37 shows a cross-sectional view of part of a facade 141 comprising a plurality of glazings 131 of the type shown in FIG. 35. Each glazing 131 is positioned adjacent another glazing 131.

To aid with the description of FIG. 37, three glazings 131, 131* and 131** are highlighted. Each glazing 131, 131* and 131** is the same as illustrated in FIG. 35, therefore each component part of glazing 131* and 131** will be referenced in the same way as for glazing 131 except with the addition of a "*" or "**" respectively after each component part (in the same manner as for FIG. 10).

When installing the glazing to make facade 141, the second flange 134b* of glazing 131* fits into the space between the second flange 132a and the second flange 134a of glazing 151 such that the flange 132a faces the web 134c* of the second channel-section glazing element 134* of glazing 131*. Consequently, the flange 134b* of the second channel-section glazing element 134* of the glazing 131* faces the web 132c of the first channel-section glazing element 132 of the glazing 131.

As shown in FIG. 37, the second flange 134b of glazing 131 fits into the space between the second flange 132a* and the second flange 134a* of glazing 131* such that the flange 132a* faces the web 134c of the second channel-section glazing element 134 of glazing 131. Consequently, the flange 134b of the second channel-section glazing element 134 of the glazing 131 faces the web 132c* of the first channel-section glazing element 132* of the glazing 131*.

The glazings 131 forming the facade 141 may be vertically or horizontally orientated.

For each glazing 131, 131*, 131** etc. in the facade there may be suitable sealant material in between adjacent longitudinal edges.

As shown in FIG. 37, the webs 132c of each first channel-section glazing element 132 of each respective glazing 131 form the outer surface of the facade i.e. that surface facing the outside of the building in which the facade is installed. The inner facing surface is formed by the webs 134c of the second channel-section glazing element 134 of each respective glazing 131.

Due to the inclusion of the first sheet of glass 133 and the second sheet of glass 135 in each glazing 131, the facade has improved thermal performance. The thermal performance can be improved further by the inclusion of a low emissivity coating on the glass sheets of each glazing 131 and/or the first and/or second channel-section glazing elements as described with reference to FIG. 35.

A close up of the region "I" is shown in FIG. 38 to show in more detail how two adjacent glazings 131 and 131* are configured in the facade 141. FIG. 39 shows more detail of one glazing 131 in the facade 141. In FIG. 39 the glazing 131 is shown horizontally arranged for clarity. Portions of the glazings to the left and right of the glazing 131 in FIG. 39 are shown in phantom.

With reference to FIGS. 35, 38 and 39, in the space between the first flange 134a of the channel-section glazing element 134 and the first flange 132a of the channel-section glazing element 132 is the second flange 134b* of the channel-section glazing element 134*.

A clip 142 is located over the upper ends of the first flange 134a and the second flange 134b*. By "upper end of the flange", it is meant that end of the flange opposite the web. On one side the clip 142 extends part way down the second flange 134b* towards the web 134c*. On the other side, the clip 142 extends the whole length of the inside of the first flange 134a towards the web 134c. These two sides of the clip 142 are connected by a section that spaces the upper ends of the flanges 134a, 134b* from the web 132c.

Adjacent the flange 134a a side of the clip 142 is positioned. Along this side of the clip 142 are two slots configured to receive the edges of the first and second sheets of glass 133, 135 of the glazing 131.

The clip 142 ensures the channel-section glazing elements 134, 134* (and hence glazings 131, 131*) are correctly configured in the facade 141. The clip 142 also ensures the correct positioning of the sheets of glass 133, 135 in the glazing 131. The slots in the clip 142 are configured to provide the desired space 139 between the first and second sheets of glass 133, 135.

In the space between the second flange 134b* of the channel-section glazing element 134* and the second flange 132b* of the channel-section glazing element 132* is the first flange 132a of the channel-section glazing element 132.

A clip 143* is located over the upper ends of the second flange 132b* and the first flange 132a. On one side the clip 143* extends part way down the first flange 132a towards the web 132c. On the other side, the clip 143*extends the whole length of the inside of the second flange 32b* towards the web 132c*. These two sides of the clip 143* are connected by a section that spaces the upper ends of the flanges 132a, 132b* from the web 134c*.

Adjacent the flange 132b* a side of the clip 143* is positioned. Along this side of the clip 143* are two slots configured to receive the edges of the first and second sheets of glass 133*, 135* of the glazing 131*.

The clip 143* ensures the channel-section glazing elements 132, 132* (and hence glazings 131, 131*) are correctly configured in the facade 141. The clip 143* also ensures the correct positioning of the sheets of glass 133*, 135* in the glazing 131*. The slots in the clip 143* are configured to provide the desired space 139* between the first and second sheets of glass 133*, 135*.

The clips 142, 143* are typically of a moulded plastic construction.

Where the clip 143* extends over the upper ends of the second flange 132b* and the first flange 132a (shown in FIG. 38 as the hashed region 144* of the clip 143*), the clip 143* may have a double walled construction such that one wall of the clip 143* in that region (i.e. region 144*) is configured to face the upper ends of the second flange 132b* and the first flange 132a and the other wall of the clip 143* in that region is configured to face the web 134*, there being a space between the walls of the clip in that region. Such a double walled configuration provides the clip 143* with a thermal break between the upper ends of the second flange 132b* and the first flange 132a and the web 134*. The clip 142 may be configured in a similar manner.

It will be readily apparent that the clips 90, 90' may be configured in a similar manner to the clips 142, 143* shown above, except instead of the two slots for clips 142, 143*, there is only one slot. The clips 90, 90' may also have a double walled construction as described above.

FIG. 38 also shows the sealant 146, 148 used to seal the gaps between adjacent channel-section glazing elements. Sealant 146 seals the gap between channel-section glazing element 132 of glazing 131 and channel-section glazing element 132* of glazing 131*. Sealant 148 seals the gap between channel-section glazing element 134 of glazing 131 and channel-section glazing element 134* of glazing 131*. Sealant may be used in this way in the facades 29, 39, 49, 59, 69, 89 previously described, and also in the facade shown in FIG. 31.

It will be readily apparent that glazing 131 has a clip 143 identical to the clip 143* and that glazing 131* has a clip 142* identical to clip 142. This is illustrated in FIG. 39.

FIG. 39 shows the glazing 131 in the facade 141 orientated horizontally for clarity. The glazings either side of glazing 131 are shown in phantom only. As the figure shows there are two clips 142, 143 used to maintain the spatial relationship of the sheets of glass 133, 135 in the glazing 131. The clips 142, 143 also ensure the glazing is configured in the correct manner in the facade 141 as described above.

It is possible that the clips 142, 143 only extend down the insides of the respective flanges 134a, 132b (for example as shown in FIG. 25, although with two slots), in which case the clips only ensure the sheets of glass 133, 135 are in the desired spatial arrangement in the cavity.

Figure 40:
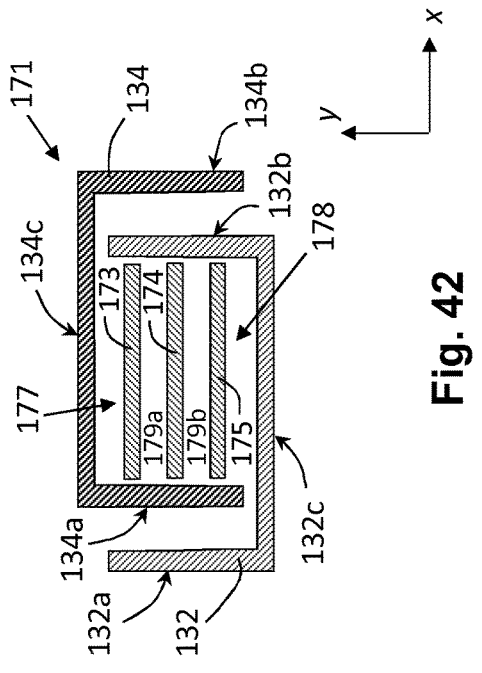
FIGS. 40 to 45 show cross-sectional views of other glazings according to the present invention.

FIG. 40 shows another glazing 151 in accordance with the present invention. The glazing 151 is similar to the glazing 131 shown in FIG. 35 having first and second channel-section glazing elements 132, 134 as previously defined. However instead of two individual glass sheets 133, 135 located in the cavity defined by the inner surfaces of the flanges 134a, 132b and portions of the inner surfaces of the webs 132c, 134c that are present in the glazing 131, located in said cavity is an insulated glazing unit (abbreviated as an IGU) 152. The IGU 152 comprises a first sheet of glass 153 spaced apart from a second sheet of glass 155 by a perimeter seal 154, as is conventional for an IGU. The space 159 between the first and second sheets of glass 153, 155 may be an air space, or may contain an inert gas. Alternatively, the space 159 may be evacuated, in which case the IGU is an evacuated IGU.

There is a space 157 between the web 134c and the first sheet of glass 153 of the IGU 152 and a space 158 between the web 132c and the second sheet of glass 155 of the IGU 152.

Although the IGU 152 is shown having two sheets of glass 153, 155 and one air space 159, the IGU may contain more than two sheets of glass or other suitable glazing material and two or more air spaces.

The IGU 152 may be positioned in the cavity using a suitable configured clip of the type described with reference to FIGS. 38 and 39.

In an alternative to the embodiment shown, there may be one or more IGU located in the cavity, spaced apart from the IGU 152. In another alternative there may be one or more sheet of glazing material spaced apart from the IGU 152.

Figure 41:
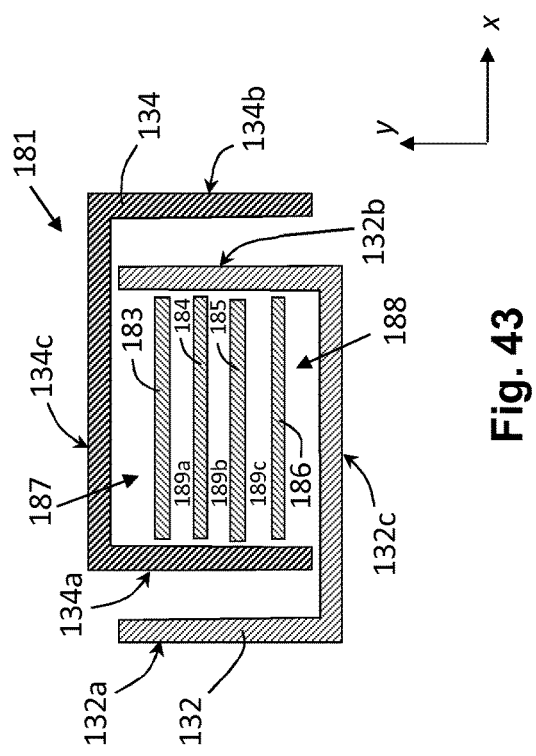

FIG. 41 shows another glazing 161 in accordance with the present invention. The glazing 161 is similar to the glazing 131 having first and second channel-section glazing elements 132, 134 as previously described with reference to FIG. 35. Located in the cavity defined by the inner surfaces of the flanges 134a, 132b and portions of the inner surfaces of the webs 132c, 134c, a first sheet of plastic 163 and a third channel-section glazing element 165 are located. The channel-section glazing element 165 is an inner channel-section glazing element. The channel-section glazing element 165 is of the type described with reference to FIG. 2, but may be of the type described with reference to FIG. 1. There is a space 167 between the web 134c and the sheet of plastic 163, a space 168 between the web 132c and the channel-section glazing element 165 and a space 169 between the sheet of plastic 163 and the channel-section glazing element 165.

There may be a sheet of glazing material located in the space 169 between the sheet of plastic 163 and the channel-section glazing element 165.

In an alternative embodiment to that shown in FIG. 41, the first sheet of plastic is replaced by a sheet of glass having lateral fire polished edges or lateral cut edges.

In another alternative to that shown in FIG. 1, the first sheet of plastic 63 is replaced by one or more of a sheet of glass, a channel-section glazing element, an IGU or a laminated glazing.

In another embodiment to that shown in FIG. 41, the channel-section glazing element may be a laminated channel-section glazing element having a sheet of glazing material, preferably glass, joined to the web of the channel-section glazing element by means of an interlayer structure.

Figure 42:
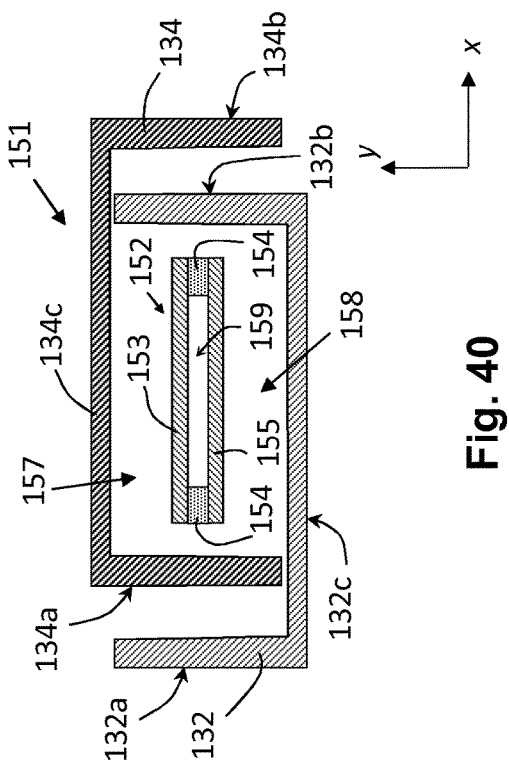

FIG. 42 shows another glazing 171 in accordance with the present invention. The glazing 171 is similar to the glazing 131 shown in FIG. 35 except there are three sheets of glass 173, 174 and 175 located in the cavity defined by the inner surfaces of the flanges 134a, 132b and portions of the inner surfaces of the webs 132c, 134c.

There is a space 177 between the sheet of glass 173 and the web 134c. There is a space 178 between the sheet of glass 175 and the web 132c. There is a space 179a between the sheet of glass 173 and the sheet of glass 174. There is a space 179b between the sheet of glass 174 and the sheet of glass 175.

One or more of the glass sheets 173, 174, 175 may have fire polished lateral edges. One or two of the glass sheets 173, 174, 175 may be replaced by a sheet of plastic.

In an alternative embodiment to that shown in FIG. 42, there is one or more further sheets of glass or other suitable glazing material located in the cavity, positioned such that there is at least one further space between the sheet of glass 173 and the sheet of glass 174 i.e. the space 179a is divided into two or more spaces.

One or more of the glass sheets 173, 174 and 175 may have a low emissivity coating and/or a solar control coating on at least one major surface thereof.

Figure 43:
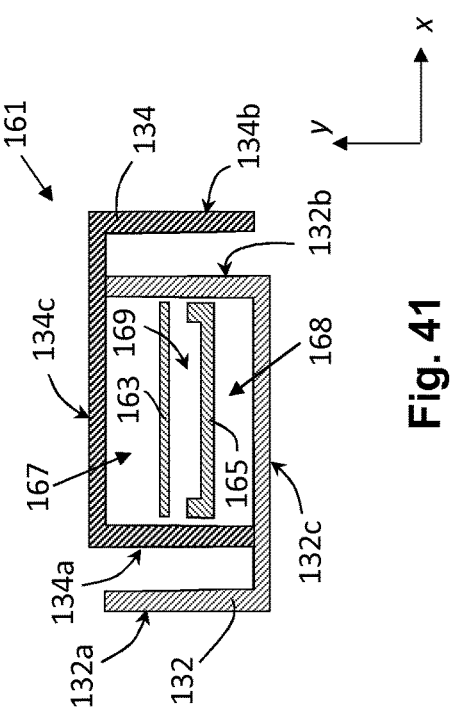

FIG. 43 shows another embodiment having four sheets of glass 183, 184, 185 and 186 located in the cavity defined by the inner surfaces of the flanges 134a, 132b and portions of the inner surfaces of the webs 132c, 134c. The glazing 181 is similar to that shown in FIG. 35 having first and second channel-section glazing elements 132, 134 as previously defined.

Each sheet of glass 183, 184, 185, 186 may have a different thickness. As described in relation to the embodiment shown in FIG. 35, one or more of the sheets of glass 183, 184, 185 and 186 may have a solar control coating and/or a low emissivity coating on at least a portion of one or more major surfaces thereof.

There is a space 187 between the sheet of glass 183 and the web 134c. There is a space 188 between the sheet of glass 186 and the web 132c. There is a space 189a between the sheet of glass 183 and the sheet of glass 184. There is a space 189b between the sheet of glass 184 and the sheet of glass 185. There is a space 189c between the sheet of glass 185 and the sheet of glass 186.

At least one of the glass sheets 183, 184, 185, 186 may have one or more fire polished edge, in particular a lateral edge. One, two or three of the glass sheets may be replaced by a sheet of plastic.

Clips such as previously described with reference to FIGS. 38 and 39 may be used in the glazing 171, 181 to maintain the spatial arrangement of the glass sheets and/or channel-section glazing elements. It will be immediately apparent that the number of slots in the clips should be modified to accommodate the desired number of inner glazing panes.

Figure 44:
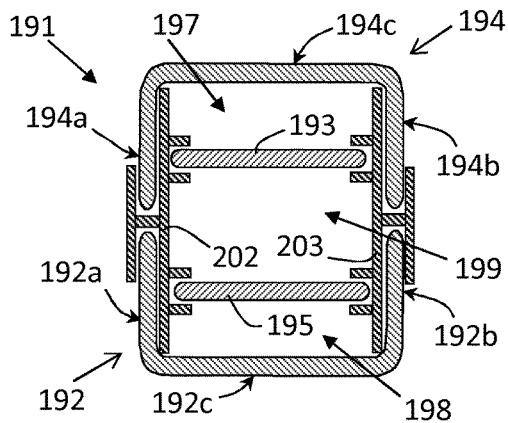

FIG. 44 shows another glazing 191 in accordance with the present invention. The glazing 191 comprises a first channel-section glazing element 192 and a second channel-section glazing element 194. Each channel section glazing element 192, 194 is of the type described with reference to FIG. 2.

The channel-section glazing element 192 has a web 192c with flanges 192a, 192b along lateral edges thereof.

The channel-section glazing element 94 has a web 94c with flanges 94a, 94b along lateral edges thereof.

The channel-section glazing elements 192, 194 have substantially the same dimensions.

The end of the flange 192a faces the end of the flange 194a and the end of the flange 192b faces the end of the flange 194b.

The inner facing surfaces of the channel-section glazing elements 192, 194 define a cavity. The cavity is split into three airspaces 197, 198, 199 by two sheets of flat glass 193, 195 located in the cavity. The airspace 197 is between the web 194c and the sheet of glass 193. The airspace 198 is between the glass sheet 195 and the web 192c. The airspace 199 is between the glass sheets 193 and 195.

The sheets of flat glass 193, 195 each have two fire-polished lateral edges, although one of the flat glass sheets may have one or more cut lateral edge The flat glass sheets 193, 195 are held in position in the cavity by clips 202, 203. The clip 202 is configured to engage with the upper ends of the flanges 192a, 194a and one edge of each glass sheet 193, 195. Similarly, the clip 203 is configured to engage with the upper ends of the flanges 192b, 194b and the opposite edge of each glass sheet 193, 195.

The clips 202, 203 maintain a space between the ends of the flanges of the channel-section glazing elements 192, 194 such that there is a gap between the ends of the flanges of each channel-section glazing element 192, 194.

The clips 202, 203 are configured such that the glass sheet 195 is positioned between the flanges 192a, 192b of channel-section glazing element 192 and that the glass sheet 193 is positioned between the flanges 194a, 194b of channel-section glazing element 194.

In the embodiment shown the flat glass sheets 193, 195 are spaced apart in a parallel arrangement but they may be arranged such that they are not parallel by suitable clips.

Figure 45:
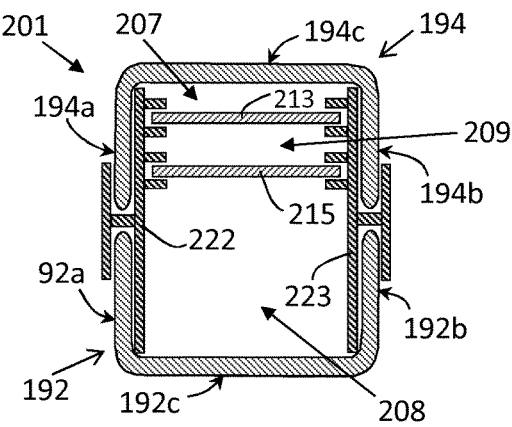

FIG. 45 shows another glazing 201 in accordance with the present invention and is similar to the embodiment shown in FIG. 44. The glazing 201 comprises first and second channel-section glazing elements 192, 194 as defined in relation to FIG. 44. The glazing also comprises glass sheets 213, 215. Glass sheet 213 has fire-polished lateral edges.

In this example the cavity is again divided into three airspaces 207, 208, 209. There is a space 207 between the glass sheet 213 and the web 194c. There is a space 208 between the glass sheet 215 and the web 192c. There is a space 209 between the glass sheet 213 and glass sheet 215.

Clips 222, 223 are configured such that both the glass sheets 213, 215 are between the flanges 194a, 194b of the channel-section glazing element 194.

Figure 46:
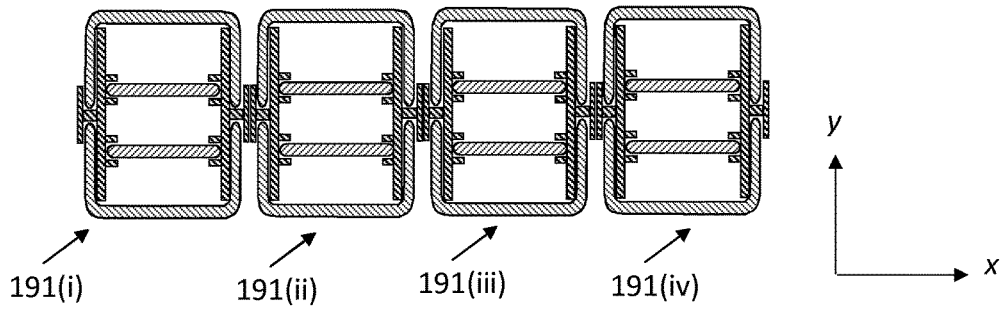
FIG. 46 is a cross-sectional view of a facade comprising four glazings of the type shown in FIG. 44.

In FIG. 46 there are shown four glazings of the type shown in FIG. 44. The glazings are each referred to as 191(i), 191(ii), 191(iii) and 191(iv). The component parts in each glazing is designated by a (i), (ii), (iii) or (iv). For example, the first flat glass sheet in glazing 191(ii) is referred to as 193(ii) and the second flat glass sheet is referred to as 195(ii).

Glazing 191(i) is connected to glazing 191(ii) due to the clip 203(i) of glazing 191(i) and the clip 202(ii) of glazing 191(ii) having been modified.

Figure 47:
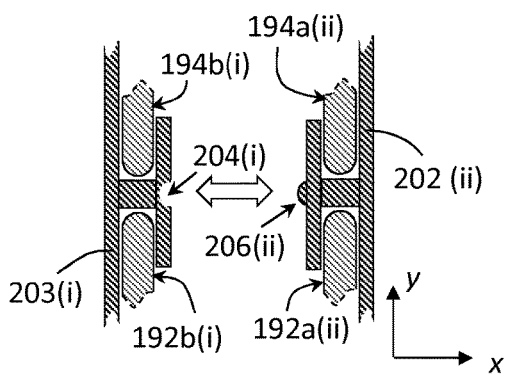
FIG. 47 is a cross-sectional view of a portion of the facade shown in FIG. 46 illustrating how two adjacent clips engage.

In one embodiment shown in FIG. 47 the clip 203(i) has a groove 204(i) configured to engage with a projection 206(ii) on the side of clip 202(ii). The projection 206(ii) may be a snap fit with the groove 204(i) and releasably attachable thereto.

Figure 48:
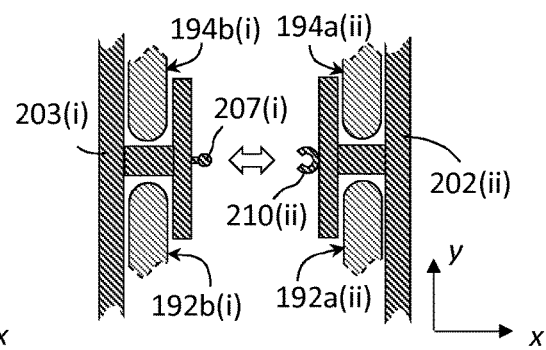
FIG. 48 is a cross-sectional view of a portion of the facade shown in FIG. 16 illustrating another way how two adjacent clips engage.

In another embodiment shown in FIG. 48 the clip 203(i) has a projecting element 207(i) configured to engage with a projecting groove 210(ii) on the side of clip 202(ii). The projecting element 207(i) fits into the projecting groove 210(ii) and is releasably attachable thereto.

Other forms of male/female engaging parts for connecting adjacent clips may be used.

The clips for the other glazings 191(iii) and 191(iv) may be modified in a similar way such that glazing 191(iii) is attached to glazing 191(ii) and glazing 191(iv).

The use of clips having male/female engaging parts of the type shown in FIGS. 47 and 48 is advantageous because each glazing 191 may be pre-assembled and a facade more quickly assembled by clipping together adjacent glazings.

The present invention has the particular advantage that glazings may be conveniently manufactured using channel-section glazing elements that provide improved thermal performance. By using low emissivity coatings on one or more major surfaces of one or more of the glazing elements, the thermal performance may be further improved. Mechanical performance may be modified by the particular type of inner glazing element used. It is possible to retrofit existing glazings to improve the thermal and/or noise performance thereof.

The invention claimed is:

1. A glazing comprising a first channel-section glazing element and a second channel-section glazing element, the first and second channel-section glazing elements each comprising a web and a first flange, the first flange running along a first lateral edge of the respective web, the first and second channel-section glazing elements being arranged such that the first flange of the first channel-section glazing element faces the web of the second channel-section glazing element and the first flange of the second channel-section glazing element faces the web of the first channel-section glazing element, wherein an inner glazing element is located between a portion of the web of the first channel-section glazing element and a portion of the web of the second channel-section glazing element, the inner glazing element being adjacent the first flange of the first channel-section glazing element, further wherein there is a first space between the inner glazing element and the web of the first channel-section glazing element and a second space between the inner glazing element and the web of the second channel-section glazing element, characterised in that the inner glazing element comprises a glass glazing element, and wherein the inner glazing element is located between a first clip and a second clip, the first clip and/or second clip comprising an elongate member having a first major surface and a second opposing major surface, a first slot of the first clip being on the first major surface of the elongate member of the first clip and at least a portion of a first edge of the inner glazing element being received in the first slot of the first clip.

2. The glazing according to claim 1, wherein the web of the first channel-section glazing element has a second flange running along a second lateral edge thereof, the second lateral edge of the web of the first channel-section glazing element being opposite the first lateral edge of the web of the first channel-section glazing element and/or wherein the web of the second channel-section glazing element has a second flange running along a second lateral edge thereof, the second lateral edge of the web of the second channel-section glazing element being opposite the first lateral edge of the web of the second channel-section glazing element.

3. The glazing according to claim 1, wherein the glass glazing element comprises a channel-section glazing element comprising a web and at least one flange, preferably wherein the glass glazing element has a first flange portion running along a lateral edge of the web of the glass glazing element and a second flange portion running along the opposing lateral edge of the web of the glass glazing element.

4. The glazing according claim 3, wherein the web of the glass glazing element has a first major surface and an opposing second major surface and wherein the first and/or second major surface of the web of the glass glazing element has a pattern thereon, and/or there is a low emissivity coating or a solar control coating on at least a portion of the first major surface of the web of the glass glazing element, and/or there is a low emissivity coating or a solar control coating on at least a portion of the second major surface of the web of the glass glazing element, or there is a low emissivity coating on at least a portion of the first major surface of the web of the glass glazing element and a solar control coating on at least a portion of the second major surface of the web of the glass glazing element.

5. The glazing according to claim 1, wherein the glass glazing element comprises a sheet of glass.

6. The glazing according to claim 5, wherein the sheet of glass has at least one fire polished edge.

7. The glazing according to claim 5, wherein the sheet of glass has a first major surface and an opposing second major surface and wherein the first and/or second major surface of the glass sheet has a pattern thereon, and/or there is a low emissivity coating or a solar control coating on at least a portion of the first major surface of the glass sheet, and/or there is a low emissivity coating or a solar control coating on at least a portion of the second major surface of the glass sheet, or there is a low emissivity coating on at least a portion of the first major surface of the glass sheet and a solar control coating on at least a portion of the second major surface of the glass sheet.

8. The glazing according to claim 6, wherein the sheet of glass has two or more fire polished edges, preferably wherein two of the two or more fire polished edges are along opposing lateral edges of the sheet of glass.

9. The glazing according to claim 1, wherein the web of the first and second channel-section glazing element has a first major surface and an opposing second major surface, further wherein at least a portion of the first and/or second major surface of the web of the first and/or second channel-section glazing element has a coating thereon, preferably a low emissivity coating or a solar control coating and/or wherein the first and/or second major surface of the web of the first and/or second channel-section glazing element has a pattern thereon.

10. The glazing according to claim 1, wherein the inner glazing element comprises at least two glazing panes (a first glazing pane and a second glazing pane) separated by at least one space (a third space), the inner glazing element being arranged such that the first space is between the first glazing pane and the web of the first channel-section glazing element and the second space is between the second glazing pane and the web of the second channel-section glazing element, further wherein the first glazing pane comprises the glass glazing element and the second glazing pane comprises a first sheet of glazing material.

11. The glazing according to claim 1, wherein the inner glazing element comprises a plurality of glazing panes.

12. The glazing according to claim 1, wherein the first and/or second clip comprises a second slot configured to receive at least a portion of a flange of a channel-section glazing element.

13. The glazing according to claim 1, wherein the second major surface of the elongate member of the first clip is adjacent the first flange of the first channel-section glazing element.

14. The glazing according to claim 1, wherein the first and/or second clip comprises a third slot configured to receive at least a portion of a flange of a channel-section glazing element, preferably the first and/or second channel-section glazing element.

15. A method of assembling a facade comprising the steps:
(a) providing a frame for connection with a glazing according to claim 1;
(b) inserting the first channel-section glazing element into the frame;
(c) inserting the inner glazing element into the frame to face the first channel-section glazing element, and positioning the inner glazing element to be adjacent the first flange of the first channel-section glazing element; and
(d) inserting the second channel-section glazing element into the frame such that the first flange of the first channel-section glazing element faces the web of the second channel-section glazing element and the first flange of the second channel-section glazing element faces the web of the first channel-section glazing element.

16. A glazing comprising a first channel-section glazing element and a second channel-section glazing element, the first and second channel-section glazing elements each comprising a web, a first flange and a second flange, the first flange running along a first lateral edge of the respective web and the second flange running along a second lateral edge of the respective web, the first lateral edge of the web being opposite the second lateral edge of the web, the first and second channel-section glazing elements being arranged such that the first flange of the first channel-section glazing element faces the first flange of the second channel-section glazing element and the second flange of the first channel-section glazing element faces the second flange of the second channel-section glazing element, wherein an inner glazing element is located between a portion of the web of the first channel-section glazing element and a portion of the web of the second channel-section glazing element such that there is a first space between the inner glazing element and the web of the first channel-section glazing element and a second space between the inner glazing element and the web of the second channel-section glazing element, characterised in that the inner glazing element comprises a sheet of glass having at least one fire-polished edge, and wherein the inner glazing element is located between a first clip and a second clip, the first clip and/or second clip comprising an elongate member having a first major surface and a second opposing major surface, a first slot of the first clip being on the first major surface of the elongate member of the first clip and at least a portion of a first edge of the inner glazing element being received in the first slot of the first clip.

17. The glazing according to claim 16, wherein the sheet of glass extends between the first and second flanges of the first channel-section glazing element, or wherein the sheet of glass extends between the first and second flanges of the second channel-section glazing element, or wherein the first and second channel-section glazing elements are separated by a gap and the sheet of glass is positioned in the gap.

* * * * *